(12) United States Patent
Aston et al.

(10) Patent No.: US 11,345,489 B2
(45) Date of Patent: May 31, 2022

(54) SATELLITE DISPENSER AND METHOD OF SUPPORTING A PLURALITY OF SATELLITES

(71) Applicant: The Boeing Company, Chicago, IL (US)

(72) Inventors: Richard W. Aston, Brea, CA (US); Arjun K. Sharma, Culver City, CA (US)

(73) Assignee: The Boeing Company, Chicago, IL (US)

( * ) Notice: Subject to any disclaimer, the term of this patent is extended or adjusted under 35 U.S.C. 154(b) by 178 days.

(21) Appl. No.: 16/543,758

(22) Filed: Aug. 19, 2019

(65) Prior Publication Data

US 2021/0053702 A1  Feb. 25, 2021

(51) Int. Cl.
*B64G 1/64* (2006.01)
*B64G 1/10* (2006.01)

(52) U.S. Cl.
CPC ........... *B64G 1/641* (2013.01); *B64G 1/1085* (2013.01); *B64G 2001/643* (2013.01)

(58) Field of Classification Search
CPC .................. B64G 1/641; B64G 1/1085; B64G 2001/643; B64G 1/64; B64G 1/22; B64G 1/645; F16B 31/021
See application file for complete search history.

(56) References Cited

U.S. PATENT DOCUMENTS

| | | | | |
|---|---|---|---|---|
| 3,174,706 A | * | 3/1965 | Wagner | B64G 1/641 244/173.3 |
| 3,380,687 A | * | 4/1968 | Ford | B64G 1/641 244/173.3 |
| 5,411,226 A | * | 5/1995 | Jones | B64G 1/1085 244/173.3 |
| 5,522,569 A | * | 6/1996 | Steffy | B64G 1/641 244/158.1 |
| 5,613,653 A | * | 3/1997 | Bombled | B64G 1/641 244/173.1 |
| 5,884,866 A | * | 3/1999 | Steinmeyer | B64G 1/645 244/137.1 |
| 6,276,639 B1 | * | 8/2001 | Hornung | B64G 1/002 102/489 |
| 6,416,018 B2 | | 7/2002 | DiVerde et al. | |
| 6,789,767 B2 | | 9/2004 | Mueller et al. | |
| 9,027,889 B2 | | 5/2015 | Aston et al. | |

(Continued)

FOREIGN PATENT DOCUMENTS

| EP | 1 038 772 | 9/2000 | | |
|---|---|---|---|---|
| EP | 1196326 A1 | * | 4/2002 | ............... B64G 5/00 |

(Continued)

OTHER PUBLICATIONS

European Patent Office, Extended European Search Report, App. No. 20186894.0 (dated Dec. 22, 2020).

*Primary Examiner* — Medhat Badawi
*Assistant Examiner* — Vicente Rodriguez
(74) *Attorney, Agent, or Firm* — Walters & Wasylyna LLC

(57) ABSTRACT

A satellite dispenser includes a central tubular structure. The satellite dispenser also includes a plurality of satellites arranged around the central tubular structure. The satellite dispenser further includes a plurality of shear connectors coupling the central tubular structure and the plurality of satellites arranged together in shear continuity.

20 Claims, 19 Drawing Sheets

(56) References Cited

U.S. PATENT DOCUMENTS 10,486,837 B2 * 11/2019 Field ................. B64G 1/641
2016/0368625 A1    12/2016 Field et al.

FOREIGN PATENT DOCUMENTS

| EP | 3 153 412   | 4/2017 |
|----|-------------|--------|
| FR | 2 717 770   | 9/1995 |
| WO | WO 00/09396 | 2/2000 |

* cited by examiner

SATELLITE DISPENSER AND METHOD OF SUPPORTING A PLURALITY OF SATELLITES

FIELD

This application relates to a launching and deploying satellites and, more particularly, to a satellite dispenser and method of supporting a plurality of satellites during launch and deployment.

BACKGROUND

Many modern telecommunication systems utilize a group of individual satellites that must be placed into their respective orbit and that work in concert, commonly called a satellite constellation. However, the cost of launching a satellite into space is relatively high. One way to reduce the cost of launching a satellite is to launch two or more satellites on a single launch vehicle. One method of launching multiple satellites with a single launch vehicle is by stacking multiple satellites vertically within the launch vehicle. One drawback of this arrangement is the relatively high bending loads transmitted to the stacked satellites during lift-off and ascent. Another method of launching multiple satellites with a single launch vehicle is by fastening individual satellites to a central support structure within a satellite dispenser. One drawback of this arrangement is the central support structure bears the entirety of the loads and forces transmitted during launch and ascent. In either arrangement, the structure supporting the satellites must possess sufficient strength and stiffness to fulfill the demands of launch and flight. Consequently, existing solutions add undesired weight and size in order to ensure that they provide the required strength and stiffness. Accordingly, those skilled in the art continue with research and development efforts in the field of launching and deploying multiple satellites on a single launch vehicle and, as such, apparatuses and methods intended to address the above-identified concerns would find utility.

SUMMARY

The following is a non-exhaustive list of examples, which may or may not be claimed, of the subject matter according to the present disclosure.

In an example, a disclosed satellite dispenser includes a central tubular structure. The satellite dispenser also includes a plurality of satellites arranged around the central tubular structure. The satellite dispenser further includes a plurality of shear connectors coupling the central tubular structure and the plurality of satellites arranged together in shear continuity.

In an example, a disclosed spacecraft includes a launch vehicle. The spacecraft also includes a satellite dispenser coupled to the launch vehicle. The satellite dispenser includes a central tubular structure. The satellite dispenser also includes a plurality of satellites arranged around the central tubular structure. The satellite dispenser further includes a plurality of shear connectors coupling the central tubular structure and the plurality together in shear continuity. Each one of the plurality of shear connectors is separable with the central tubular structure or one of the plurality of satellites to selectively release the plurality of satellites from the central tubular structure.

In an example, a disclosed method for supporting a plurality of satellites includes steps of: (1) arranging the plurality of satellites around a central tubular structure; and (2) releasably coupling each one of the plurality of satellites to the central tubular structure using a plurality of shear connectors. The central tubular structure and the plurality of satellites are in shear continuity.

Other examples of the disclosed satellite dispenser, spacecraft, and method will become apparent from the following detailed description, the accompanying drawings and the appended claims.

DETAILED DESCRIPTION

Figure 1:
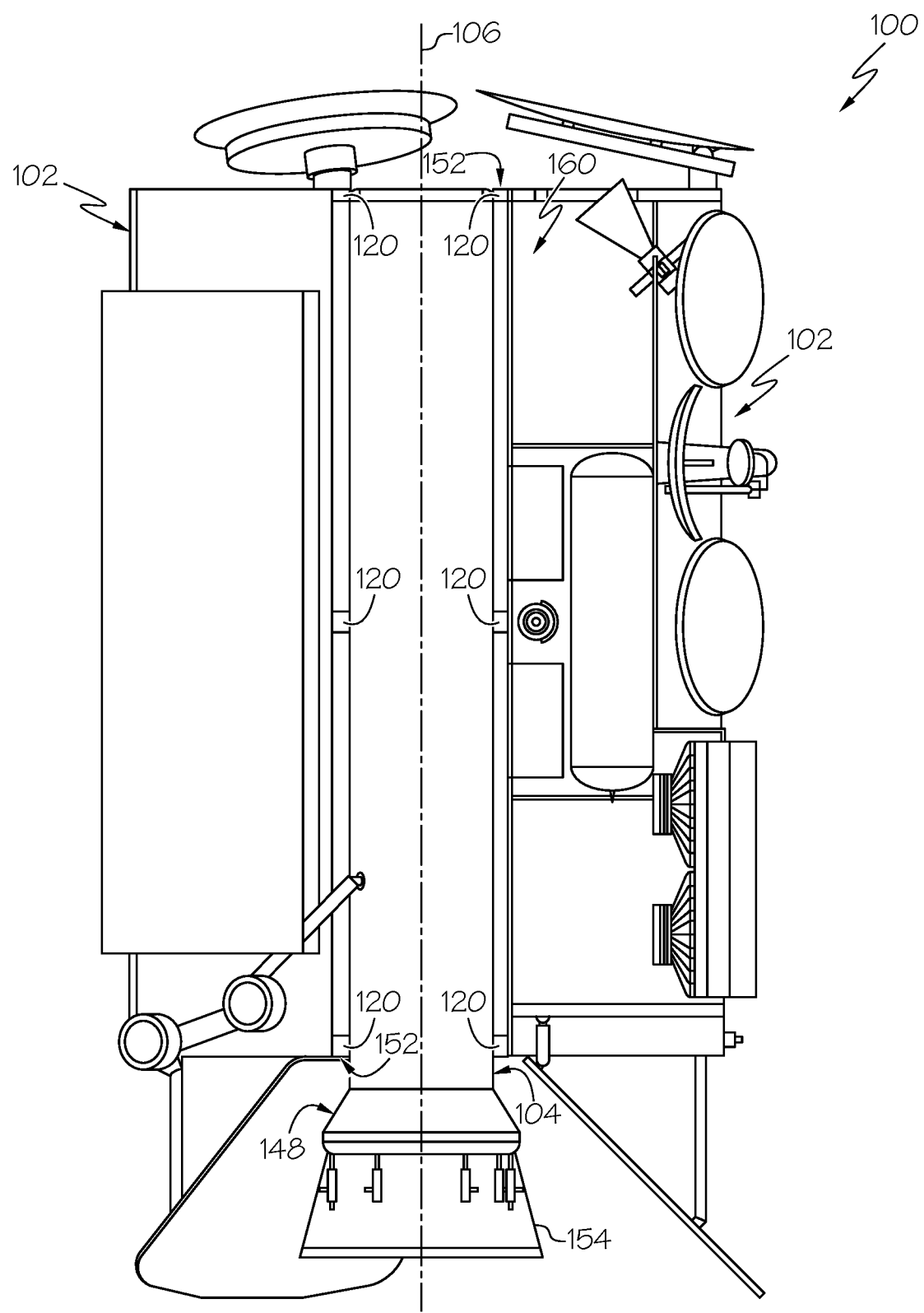
FIG. 1 is a schematic, side elevational view of an example of a satellite dispenser.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic, and/or operational step described in connection with the example is included in at least one embodiment and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

Referring generally to FIGS. 1-23, by way of examples, the present disclosure describes a satellite dispenser 100 and method 1000 of supporting a plurality of satellites 102. According to the examples provided herein, the disclosed satellite dispenser 100 is configured to support the plurality of satellites 102 during at least one of transporting the plurality of satellites 102 to a launch site, launching the plurality of satellites 102 into orbit, and deploying (or dispensing) the plurality of satellites 102 while in orbit. Similarly, according to the examples provided herein, implementation of the disclosed method 1000 includes at least one of transporting the plurality of satellites 102, launching the plurality of satellites 102, and deploying the plurality of satellites 102.

Figure 2:
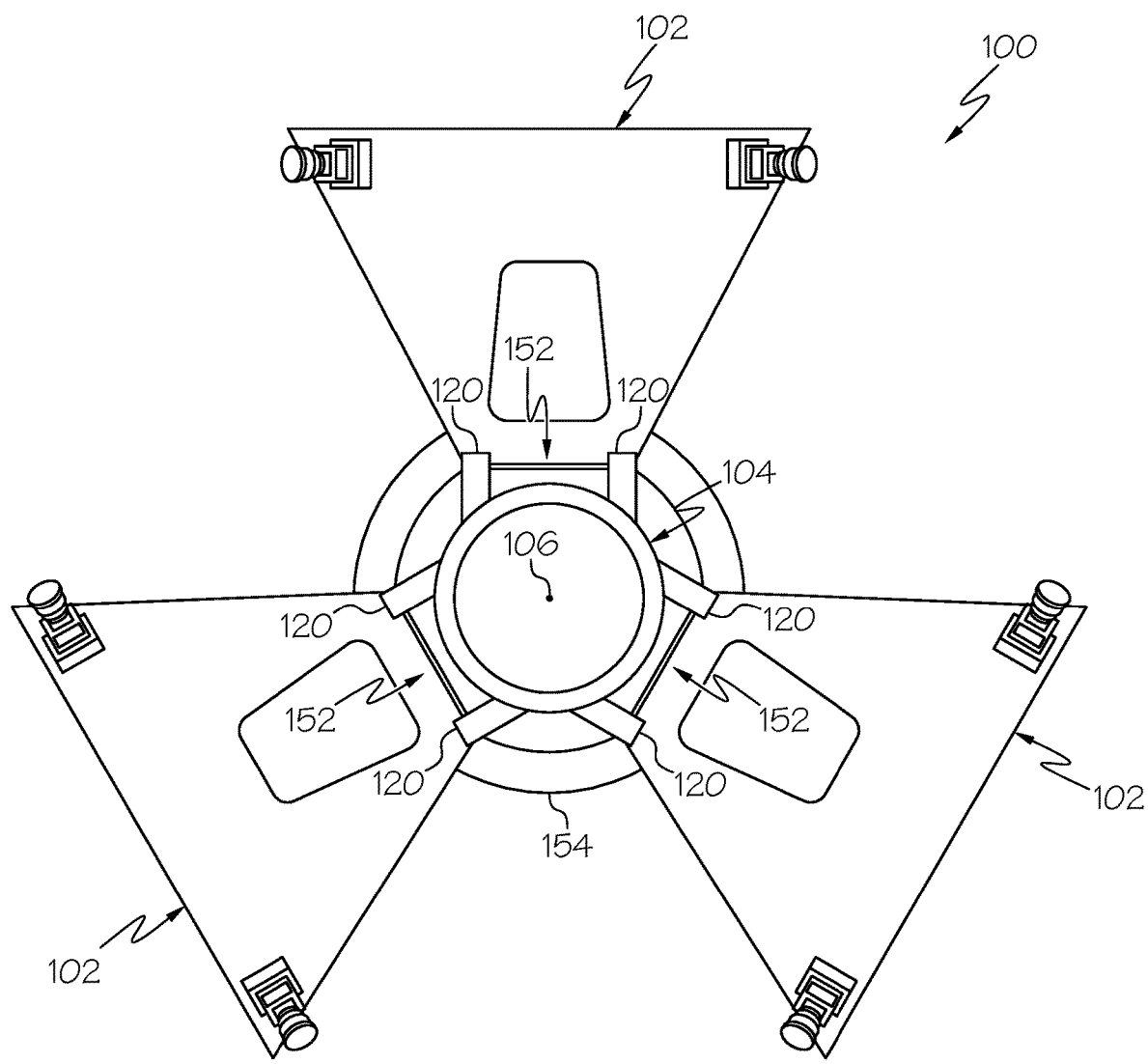
FIG. 2 is a schematic, top plan view of an example of the satellite dispenser.
Figure 3:
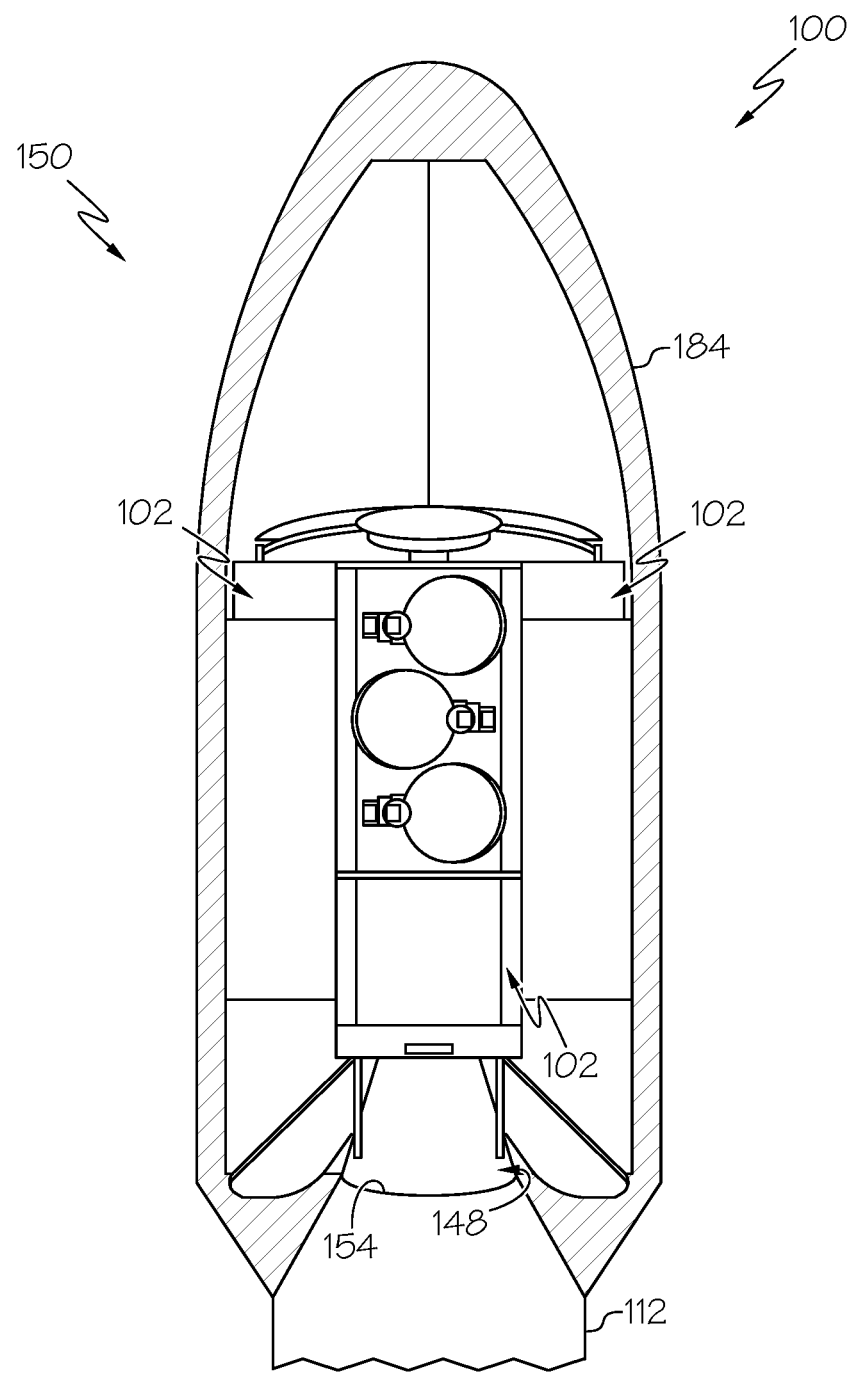
FIG. 3 is schematic, side elevational view, in partial section, of an example of the satellite dispenser.
Figure 4:
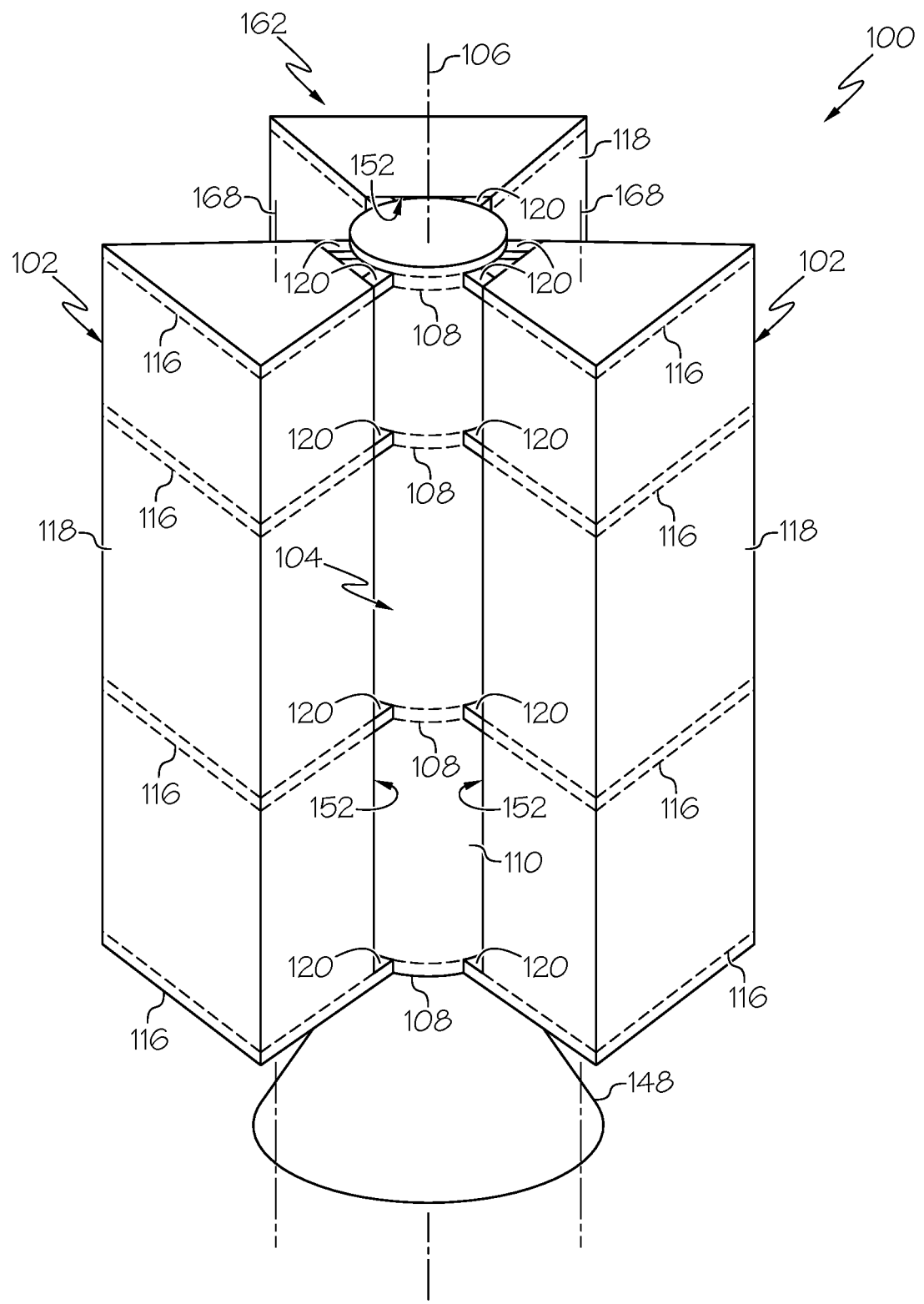
FIG. 4 is a schematic, perspective view of an example of the satellite dispenser.

FIGS. 1-4 schematically illustrate examples of the disclosed satellite dispenser 100. In FIGS. 1-3, each one of the plurality of satellites 102 is shown with various electronic, electrical, optical, and mechanical components. In FIG. 4, each one of the plurality of satellites 102 is shown as an empty body without the various electronic, electrical, optical, and mechanical components for clarity of illustration.

Referring to FIGS. 1-4, in an example, the satellite dispenser 100 includes a central tubular structure 104. The central tubular structure 104 has a longitudinal axis 106. The satellite dispenser 100 also includes a plurality of shear connectors 120 (FIGS. 1 and 2). The plurality of shear connectors 120 (e.g., each one of the plurality of shear connectors 120) is coupled to the central tubular structure 104. The satellite dispenser 100 further includes a plurality of satellites 102. The plurality of satellites 102 is arranged around the central tubular structure 104 (e.g., about the longitudinal axis 106 of the central tubular structure 104). The satellite dispenser 100 also includes a plurality of shear connectors 120 for coupling the central tubular structure 104 and the plurality of satellites 102 together in shear continuity. Each one of the plurality of shear connectors 120 is separable with the central tubular structure 104 or one of the plurality of satellites 102 to selectively release an associated one of the plurality of satellites 102 from the central tubular structure 104.

In other words, each one of the plurality of satellites 102 is releasably coupled to the central tubular structure 104 by a number of the shear connectors 120 so that the central tubular structure 104 and the plurality of satellites 102 are in shear continuity and that each one of the plurality of satellites 102 is selectively releasable from the central tubular structure 104 by selectively separating the shear connectors 120 associated with the satellite 102 being deployed. In an example, each of the plurality of shear connectors 120 is oriented perpendicular to the longitudinal axis 106. For example, a center axis 228 (FIG. 13) of the shear connector 120 is oriented approximately perpendicular to the longitudinal axis 106 of the central tubular structure 104.

As used herein, the term "shear continuity" has its ordinary meaning as known to those skilled in the art and refers to an interface with an undisrupted load path that transmits loads in all shear directions. In the illustrative examples, the satellites 102 and the central tubular structure 104 are a part of the primary shear load path and both contribute to the stiffness of the overall system.

Throughout the present disclosure, the plurality of satellites 102 may be referred to collectively as satellites 102 and individually as satellite 102. Similarly, throughout the present disclosure, the plurality of shear connectors 120 may be referred to collectively as shear connectors 120 and individually as shear connector 120.

Generally, the satellite dispenser 100 is used to transport, launch, and/or dispense the satellites 102 on a single launch vehicle 112 (FIG. 3). The central tubular structure 104 serves as a core structure that supports the satellites 102. For example, the central tubular structure 104 serves as a frame for assembling the satellites 102 in preparation for launch, as a load support for the satellites 102 during launch and ascent, and as a dispensing vehicle for deploying the satellites 102 after reaching the intended orbit.

Each satellite 102 is connected in shear with the central tubular structure 104 to achieve shear continuity between the satellites 102 and the central tubular structure 104. In other words, when coupled together, the central tubular structure 104 and the satellites 102 work together as one integrated structure (e.g., are structurally integrated) and behave as a unitary body to react to external loads and forces transmitted during launch and ascent of the satellite dispenser 100.

As used herein, the phrase "connected in shear" has its ordinary meaning as known to those skilled in the art and refers to a shear connection between the satellite 102 and the central tubular structure 104. The term "shear connection" has its ordinary meaning as known to those skilled in the art and refers to a connection or joint that allows for the transfer of shear forces between the satellite 102 and the central tubular structure 104 and that prevents linear movement of the satellite 102 relative to the central tubular structure 104 in all shear directions, as illustrated by a plurality of shear connections 152 (FIGS. 1 and 2). Throughout the present disclosure, the plurality of shear connections 152 may be referred to collectively as shear connections 152 and individually as shear connection 152.

The present disclosure recognizes and takes into account that, in conventional satellite dispensers, each of the satellites is kinematically connected to a core support and each body is viewed independently, without the presence of any other body, with respect to loading. Thus, each body (i.e., the core support structure and each satellite structure) must independently have sufficient strength and stiffness to be capable of withstanding the loads and forces transmitted during launch and ascent. This results in an increase in launch mass and an undesirably heavy system that reduces the payload capacity of the launch vehicle.

With respect to the disclosed satellite dispenser 100, the central tubular structure 104 and each satellite 102 is constructed such that neither are required to independently be capable of bearing the loads and forces transmitted during launch and ascent. Rather, the central tubular structure 104 and the satellites 102 are structurally connected in shear such that the central tubular structure 104 and each satellite 102 rely on the presence of each other for stiffness and strength. Particularly, the major loads are carried and transmitted by the satellites 102 through the central tubular structure 104 and into the launch vehicle 112. Thus, the solution provided by the disclosed satellite dispenser 100 beneficially increases the overall strength and stiffness of the satellite dispenser 100 by integrating the central tubular structure 104 and the satellites 102 as a unitary payload structure to better withstand the loads and forces applied during launch and ascent, while also beneficially reducing the launch mass of both the central tubular structure 104 and the satellites 102.

In the various examples described herein, any number of (i.e., two or more) satellites 102 can be arranged around and coupled to the central tubular structure 104 to form a single payload. In the example illustrated in FIG. 1, two satellites 102 are arranged around the central tubular structure 104 (e.g., about the longitudinal axis 106). In the examples illustrated in FIGS. 2-4, three satellites 102 are arranged around the central tubular structure 104 (e.g., about the longitudinal axis 106). While not explicitly illustrated, in other examples, four or more satellites 102 are arranged around the central tubular structure 104 (e.g., about the longitudinal axis 106).

Referring to FIG. 4, in an example, the central tubular structure 104 includes a plurality of frame members 108 and a skin 110. The skin 110 is coupled to the plurality of frame members 108. Each one of the plurality of shear connectors 120 couples one of the plurality of satellites 102 to one of the plurality of frame members 108 of the central tubular structure 104.

Throughout the present disclosure, the plurality of frame members 108 may be referred to collectively as frame members 108 and individually as frame member 108.

As illustrated in FIG. 4, in an example, each one of the plurality of satellites 102 includes a plurality of bulkheads 116 and an external shell 118. The external shell 118 is coupled to the plurality of bulkheads 116. Each one of the plurality of shear connectors 120 couples one of the plurality of bulkheads 116 to one of the plurality of frame members 108.

Figure 5:
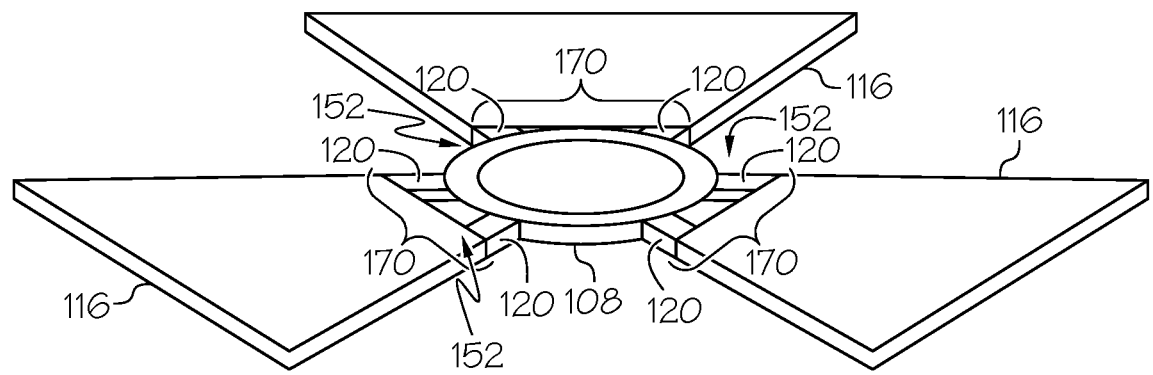
FIG. 5 is a schematic, perspective view of an example of a plurality of bulkheads of a plurality of satellites coupled to a frame member of a central tubular structure by a plurality of shear connectors.
Figure 6:
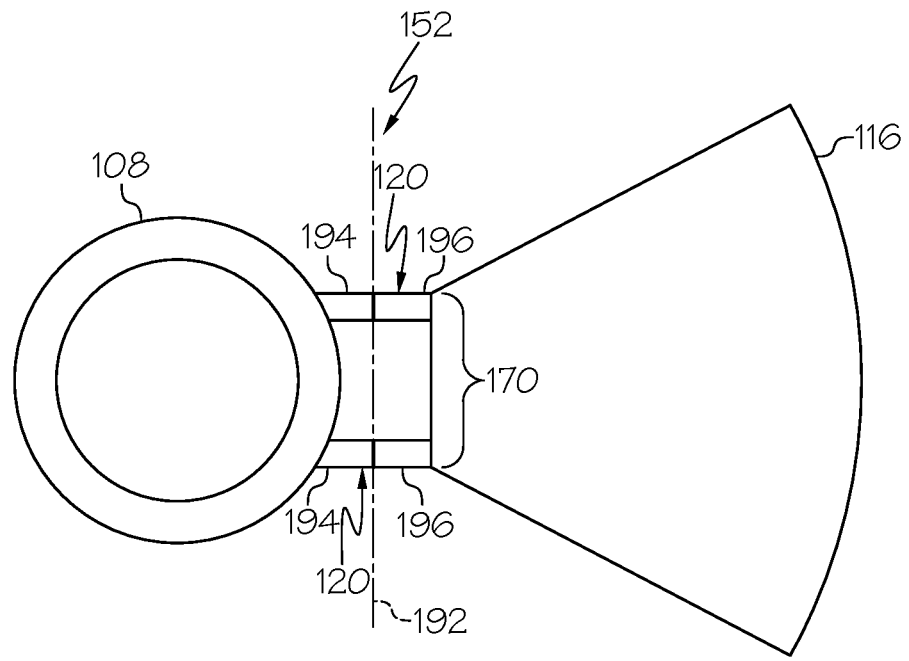
FIG. 6 is a schematic, plan view of an example of a shear connection between one of the bulkheads of a satellite and the frame member of the central tubular structure.

FIG. 5 schematically illustrates an example of the shear connections 152 between the bulkheads 116 of three satellites 102 (FIG. 4) and a corresponding frame member 108 of the central tubular structure 104 (FIG. 4). FIG. 6 schematically illustrates an example of the shear connector 120 that couples the bulkhead 116 to a corresponding frame member 108 in shear. In the illustrated examples, sets 170 of the plurality of shear connectors 120 are used to couple the plurality of bulkheads 116 of the satellites 102 to corresponding ones of the plurality of frame members 108 of the central tubular structure 104 in shear. The example illustrated in FIG. 5 shows three the sets 170 of the shear connectors 120 used to couple the bulkheads 116 associated with three satellites 102 to the corresponding frame member 108 of the central tubular structure 104 in shear. The example illustrated in FIG. 6 shows one set 170 of the shear connectors 120 used to couple the bulkhead 116 associated with one satellite 102 to the corresponding frame member 108 of the central tubular structure 104 in shear.

As used herein, the set 170 of the shear connectors 120 refers to a grouping of two or more of the shear connectors 120 associated with and coupling together one of the bulkheads 116 and one of the frame members 108. In the illustrated examples, the set 170 of shear connectors 120 includes two shear connectors 120 (e.g., a pair of shear connectors 120). However, in other examples, the set 170 of shear connectors 120 may include more than two shear connectors 120.

Referring to FIG. 6, in an example, the shear connector 120 (e.g., each one of the plurality of shear connectors 120) includes a connector first portion 194 and a connector second portion 196. The connector first portion 194 of the shear connector 120 is coupled to the frame member 108 of the central tubular structure 104. The connector second portion 196 of the shear connector 120 is coupled to the bulkhead 116 of the satellite 102. The connector first portion 194 of the shear connector 120 and the connector second portion 196 of the shear connector 120 are coupled together in shear. The connector second portion 196 is selectively separable from the connector first portion 194 other along a plane of separation 192.

In other words, the shear connector 120 is configured so that the connector second portion 196 of the shear connector 120 releases and separates from the connector first portion 194 of the shear connector 120 when the satellite dispenser 100 is in its intended orbit for deployment so that the satellite 102 is selectively released from the central tubular structure 104. Following release of the satellite 102 from the central tubular structure 104, the connector first portion 194 of the shear connector 120 stays connected to the frame member 108 of the central tubular structure 104 and the connector second portion 196 of the shear connector 120 stays connected to the bulkhead 116 of the satellite 102.

Figure 7:
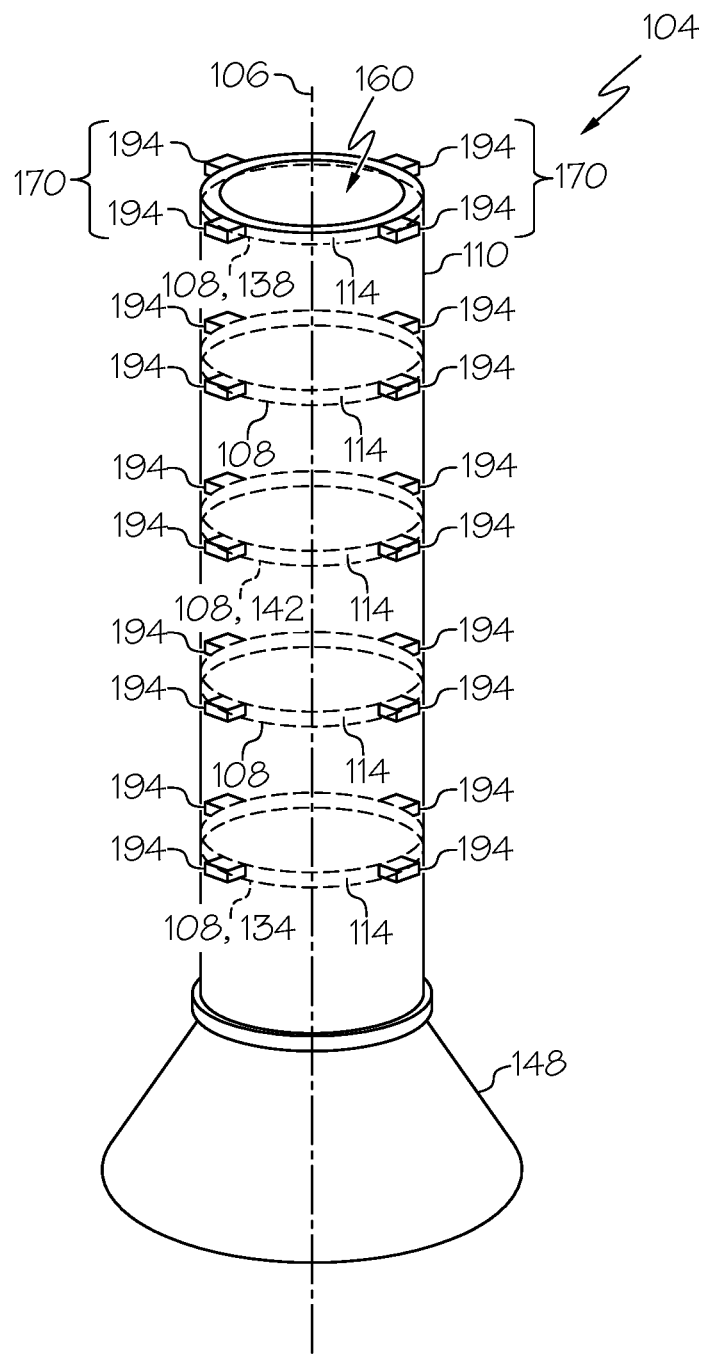
FIG. 7 is a schematic, perspective view of an example of the central tubular structure of the satellite dispenser.

FIG. 7 schematically illustrates an example of the central tubular structure 104. The example illustrated in FIG. 7 shows the connector first portion 194 of each of the shear connectors 120, which is coupled to the frame member 108 of the central tubular structure 104. In an example, the plurality of frame members 108 extend along the longitudinal axis 106 of the central tubular structure 104. In an example, at least some of the frame members 108 are spaced apart from other frame members 108 along the longitudinal axis 106 of the central tubular structure 104. For example, the spacing between different ones (e.g., adjacent ones) of the frame members 108 may depend on the spacing between the bulkheads 116 of the satellites 102 being coupled to the central tubular structure 104. Each frame member 108 circumscribes and is oriented, or lies in a plane, approximately perpendicular to the longitudinal axis 106. The skin 110 also circumscribes the longitudinal axis 106.

Integration of the central tubular structure 104 and the satellites 102 enables the use of relatively light materials for the central tubular structure 104, which, in turn, reduces the weight of the satellite dispenser 100 while providing sufficient strength and stiffness to the overall structural assembly.

The frame members 108 are made of any one of various materials. In an example, one or more of the frame members 108 is made of a metallic material, such as aluminum, titanium, and the like. In another example, one or more of the frame members 108 is made of a composite material, such as a fiber-reinforced polymer. In yet another example, one or more of the frame members 108 is made of a combination of the metallic material, the composite material, or another suitable material. In an example, each one of the frame members 108 is made of the same material. In another example, at least one of the frame members 108 is made of a different material than at least another one of the frame members 108.

The skin 110 is made of any one of various materials. In an example, the skin 110 is made of a metallic material, such as aluminum, titanium, and the like. In another example, the skin 110 is made of a composite material, such as a fiber-reinforced polymer. In yet another example, the skin 110 is made of a combination of the metallic material, the composite material, or another suitable material.

The composite material used to form the frame members 108 and/or the skin 110 may include carbon fibers, glass fibers, ceramic fibers, or other fiber types which may be unidirectional, woven, chopped, or provided in other fiber arrangements. The composite material may include a polymeric material or resin matrix, such as epoxy resin or other resin. The resin matrix may include a thermosetting resin or a thermoplastic resin.

The frame members 108 may be coupled to the skin 110 in any one of various ways, such as by mechanical fasteners, adhesive bonding, co-curing of composite materials, or a combination thereof. The frames members 108 generally assist in stiffening the central tubular structure 104 and provide a connection interface for the shear connectors 120.

In an example, the frame members 108 are located on an interior (e.g., the inside) of the central tubular structure 104. For example, each frame member 108 is coupled to an interior surface of the skin 110 of the central tubular structure 104. In another example, the frame members 108 are located on an exterior (e.g., outside) of the central tubular structure 104. For example, each frame member 108 is coupled to an exterior surface of the skin 110 of the central tubular structure 104. In another example, one or more of the frame members 108 is located on the interior of the central tubular structure 104 and one or more of the frame members 108 is located on the exterior of the central tubular structure 104.

In an example where the central tubular structure 104 includes frame members 108 located on the interior and the exterior, an inner dimension (e.g., diameter) of ones of the frame members 108 located on the exterior of the central tubular structure 104 (e.g., external frame members) is approximately equal to an outer dimension (e.g., diameter) of ones of the frame members 108 located on the interior of the central tubular structure 104 (e.g., internal frame members) and both are approximately equal to a cross-sectional dimension of the central tubular structure 104 (e.g., cross-sectional diameter), viewed along the longitudinal axis 106 of the central tubular structure 104. In an example, a distance between an inner dimension (e.g., radius) and an outer dimension (e.g., radius) of each of the frame members 108 is the same for ones of the frame members 108 located on the interior of the central tubular structure 104 (e.g., internal frame members) and ones of the frame members 108 located on the exterior of the central tubular structure 104 (e.g., external frame members).

One or more of the frame members 108 being on the exterior of the central tubular structure 104 may advantageously provide a larger area moment of inertia and provide an increase in stiffness compared to a similar frame member 108 being on the interior of the central tubular structure 104. However, one or more of the frame members 108 being on the interior of the central tubular structure 104 may advantageously provide an approximately comparable stiffness and a reduction in mass compared to a similar frame member 108 being on the exterior of the central tubular structure 104.

Referring to FIGS. 4-7, in an example, each one of the plurality of frame members 108 has a closed cross-sectional shape, viewed along the longitudinal axis 106 (FIG. 7). The closed cross-sectional shape of the plurality of frame members 108 forms a cross-sectional shape of the central tubular structure 104. In an example, each one of the plurality of frame members 108 includes, or takes the form of, a ring 114 (FIG. 7) or similar annular structure. In this example, each frame member 108 and the central tubular structure 104 has a circular cross-sectional shape, viewed along the longitudinal axis 106.

Figure 8:
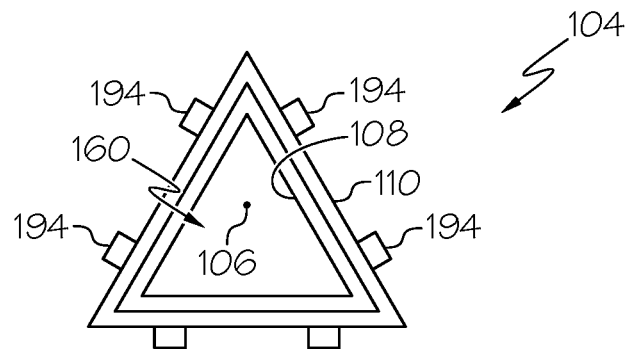
FIG. 8 is a schematic, top plan view of an example of the central tubular structure.
Figure 9:
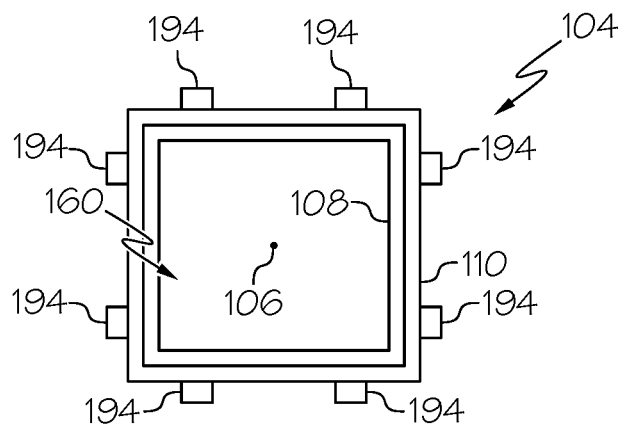
FIG. 9 is a schematic, top plan view of an example of the central tubular structure.
Figure 10:
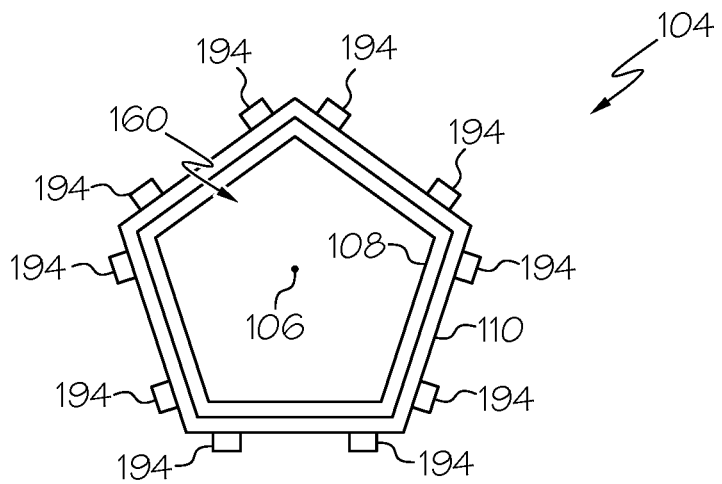
FIG. 10 is a schematic, top plan view of an example of the central tubular structure.

FIGS. 8-10 schematically illustrate examples of other cross-sectional shapes of the frame members 108 and the central tubular structure 104. Generally, the frame member 108 and the central tubular structure 104 may have any one of various other cross-sectional shapes. In an example, as illustrated in FIG. 8, each frame member 108 and the central tubular structure 104 has a triangular cross-sectional, viewed along the longitudinal axis 106. In another example, as illustrated in FIG. 9, each frame member 108 and the central tubular structure 104 has a square cross-sectional, viewed along the longitudinal axis 106. In another example, as illustrated in FIG. 10, each frame member 108 and the central tubular structure 104 has a pentagonal cross-sectional, viewed along the longitudinal axis 106. In yet another example (not illustrated), each frame member 108 and the central tubular structure 104 has another polygonal (e.g., hexagonal, octagonal, etc.) cross-sectional, viewed along the longitudinal axis 106.

The cross-sectional shape of the frame members 108 and the central tubular structure 104 selected for any given implementation of the disclosed satellite dispenser 100 may depend on various factors, such as the number of satellites 102 being launched and deployed by the satellite dispenser 100, the type of satellite 102, the size and/or weight of the satellites 102, and the like.

In an example, one or more of the frame members 108 has a first cross-sectional shape and one or more of the frame members 108 has a second cross-sectional shape, in which the first cross-sectional shape and the second cross-sectional shape are different. In this example, the cross-sectional shape of the central tubular structure 104 varies (e.g., the cross-sectional shape changes) along the longitudinal axis 106.

Each frame member 108 also has a cross-sectional dimension (e.g., a diameter in the case of the ring 114, etc.). In an example, the cross-sectional dimension of all the frame members 108 is the same. In this example, a cross-sectional dimension of the central tubular structure 104 is constant along the longitudinal axis 106, as illustrated in FIG. 7. In another example, the cross-sectional dimension of one or more of the frame members 108 is different. In this example, the cross-sectional dimension of the central tubular structure 104 varies (e.g., increases or decreases) along the longitudinal axis 106.

Figure 11:
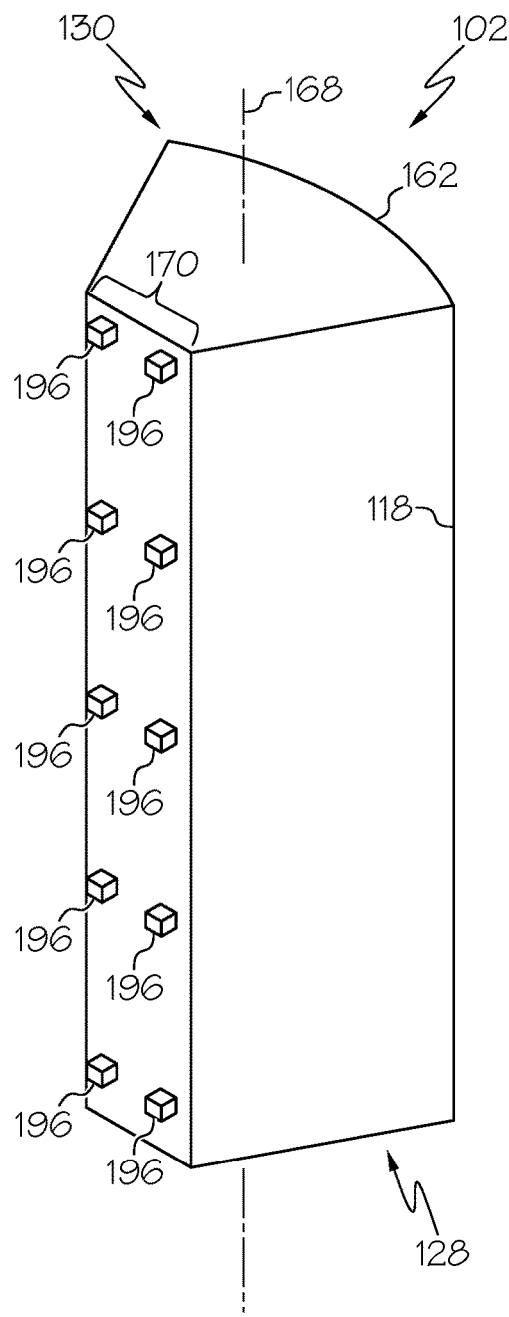
FIG. 11 is a schematic, perspective view of an example of a body of the satellite of the satellite dispenser.
Figure 12:
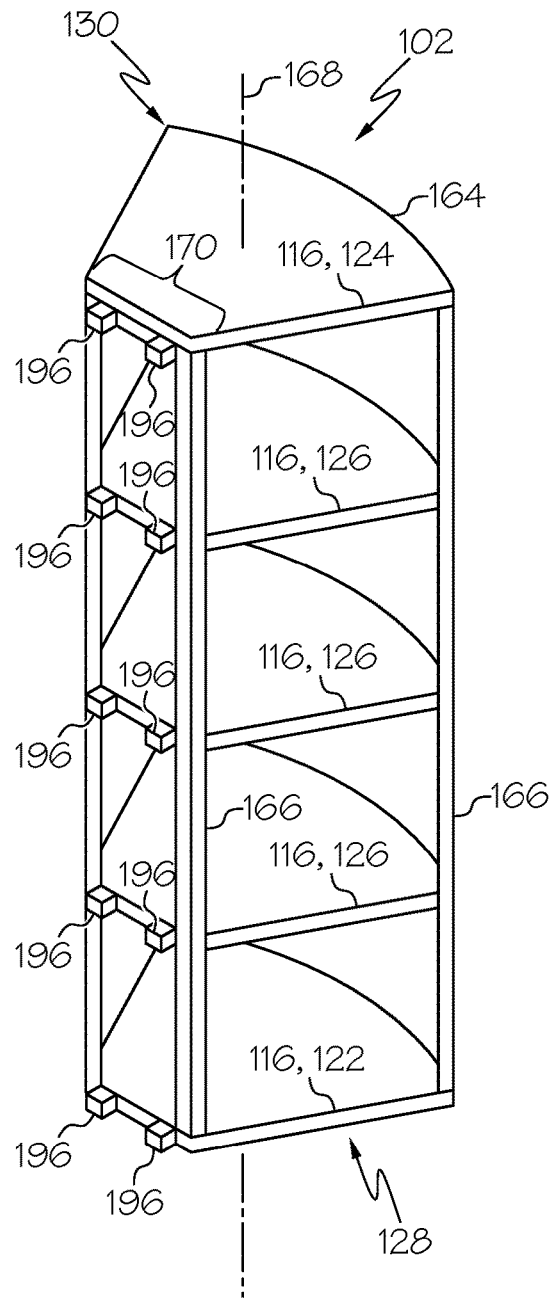
FIG. 12 is a schematic, perspective view of an example of a frame of the satellite.

FIG. 11 schematically illustrates an example of a body 162 of the satellite 102. FIG. 12 schematically illustrates an example of a frame 164 of the satellite 102. The examples illustrated in FIGS. 11 and 12 show the connector second portion 196 of each of the shear connectors 120, which is coupled to the bulkhead 116 of the satellite 102. In an example, the frame 164 (FIG. 12) of the satellite 102 forms the body 162 (FIG. 11) of the satellite 102. The examples of the satellite 102 shown in FIGS. 11 and 12 is representative of any one, or each one, of the plurality of satellites 102 that is releasably coupled to the central tubular structure 104 (FIGS. 1-4). In an example, each one of the plurality of satellites 102 includes the plurality of bulkheads 116 (FIG. 12) and the external shell 118 (FIG. 11) that is coupled to the plurality of bulkheads 116.

Generally, the satellite 102 includes a first end 128 and a second end 130, opposite to the first end 128, and has a longitudinal axis 168 that extends through the first end 128 and the second end 130. In an example, as illustrated in FIG. 4, with the satellite 102 coupled to the central tubular structure 104, the longitudinal axis 168 of the satellite 102 is approximately parallel to the longitudinal axis 106 of the central tubular structure 104.

The frame 164 (FIG. 12) of the satellite 102 includes, or is formed by, the plurality of bulkheads 116. The frame 164 may also include one or more stiffeners 166 that are coupled to the bulkheads 116 and extend along the longitudinal axis 168 of the satellite 102. The body 162 (FIG. 11) of the satellite 102 includes the frame 164 that is surrounded, or covered, by the shell 118. The body 162 serves as an empty, underlying structure of the satellite 102 to which various electronic, electrical, optical, and/or mechanical components (not shown in FIG. 11) are coupled or are housed. The frame serves as an underlying structural assembly of the satellite 102 for bearing axial, bending, and/or torsional loads.

Integration of the central tubular structure 104 and the satellites 102 enables the use of relatively light materials for the satellites 102, which, in turn, reduces the weight of the satellite dispenser 100 while providing sufficient strength and stiffness to the overall structural assembly.

Each bulkhead 116 is made of any one of various materials. In an example, one or more of the bulkheads 116 is made of a metallic material, such as aluminum, titanium, and the like. In another example, one or more of the bulkheads 116 is made of a composite material, such as a fiber-reinforced polymer. In yet another example, one or more of the bulkheads 116 is made of a combination of the metallic material, the composite material, or another suitable material. In an example, one or more of the bulkheads 116 is made of a honeycomb panel. In an example, each one of the bulkheads 116 is made of the same material. In another example, at least one of the bulkheads 116 is made of a different material than at least another one of the bulkheads 116.

The shell 118 is made of any one of various materials. In an example, the shell 118 is made of a metallic material, such as aluminum, titanium, and the like. In another example, the shell 118 is made of a composite material, such as a fiber-reinforced polymer. In yet another example, the shell 118 is made of a combination of the metallic material, the composite material, or another suitable material.

Referring to FIGS. 4, 7, and 12, a relative location of the frame members 108 (FIGS. 4 and 7) of the central tubular structure 104 is configured to match the relative locations of the bulkheads 116 (FIGS. 4 and 12) of the satellite 102 such that when the satellite 102 is arranged around the central tubular structure 104, each one of the bulkheads 116 aligns with a corresponding one of the frame members 108. For example, the bulkhead 116 is aligned with a corresponding frame member 108 when the bulkhead 116 is disposed (e.g., located or positioned) adjacent to and shares a common virtual plane with the corresponding frame member 108.

In an example, at least one shear connector 120 is associated with a corresponding one of the bulkheads 116 and a corresponding one of the frame members 108 for connecting the bulkhead 116 and the frame member 108 together in shear. In another example, as illustrated in FIGS. 4-12, at least one shear connector 120 is associated with each one of the bulkheads 116 of the satellites 102 and each one of the frame members 108 of the central tubular structure 104 for connecting each bulkhead 116 and a corresponding frame member 108 in shear.

FIG. 7 schematically illustrates an example of the central tubular structure 104 that is configured to hold two satellites 102 (not shown in FIG. 7) that are diametrically opposed to each other. In the example illustrated in FIG. 7, each frame member 108 includes two sets 170 of the shear connectors 120 (e.g., two pairs of shear connectors 120 or four total shear connectors 120). In FIG. 7, the connector first portion 194 of each shear connector 120 of each set 170 is shown. The two sets 170 of the shear connectors 120 are diametrically opposed to each other for connection of the diametrically opposed satellites 102. Each set 170 of the shear connectors 120 is configured to connect one of the bulkheads 116 of one of the satellites 102 to the corresponding frame member 108 of the central tubular structure 104 in shear.

In another example (not illustrated), each frame member 108 includes only one shear connector 120 associated with and coupling together each one of the bulkheads 116 and a corresponding one of the frame members 108. In the example in which the central tubular structure 104 is configured to hold two satellites 102, two shear connectors 120 are diametrically opposed to each other for connection of the diametrically opposed satellites 102. Each shear connector 120 is configured to connect one of the bulkheads 116 of one of the satellites 102 to a corresponding one of the frame members 108 of the central tubular structure 104 in shear.

In other examples (not illustrated), each frame member 108 may include a different number (e.g., three of more) of the shear connectors 120 or a different number of sets 170 of shear connectors 120 depending, for example, on the number of satellites 102 coupled to the central tubular structure 104, the number of shear connectors 120 used to connect each bulkhead 116 to a corresponding frame member 108 in shear, and other considerations.

FIGS. 11 and 12 schematically illustrate examples of the satellite 102 in which each bulkhead 116 of the satellite 102 includes the set 170 of the shear connectors 120 (e.g., a pair of shear connectors 120). In FIGS. 11 and 12, the connector second portion 196 of each shear connector 120 of each set 170 is shown. Each set 170 of the plurality of shear connectors 120 couples one of the plurality of bulkheads 116 to a corresponding one of the plurality of frame members 108 (FIGS. 4 and 7). In the example illustrated in FIG. 12, sets 170 of the shear connectors 120 are used to couple each one of the bulkheads 116 to a corresponding one of the frame members 108.

FIG. 7 schematically illustrates an example of the central tubular structure 104 that is configured to support two satellites 102. In other examples, the central tubular structure 104 is configured to support more than two satellites 102. In such examples, additional shear connectors 120 or additional sets 170 of the shear connectors 120 are used to connect the bulkheads 116 of additional satellites 102 to the frame members 108 of the central tubular structure 104. Accordingly, various numbers and configurations of the shear connectors 120 relative to the frame member 108 and/or the bulkhead 116 are also contemplated.

FIGS. 4, 5, and 8 schematically illustrate examples of the central tubular structure 104 that are configured to hold three satellites 102. In these examples, each frame member 108 includes three shear connectors 120 or three sets 170 of the shear connectors 120. Each shear connector 120 is configured to connect one of the bulkheads 116 of one of the satellites 102 to the corresponding frame member 108 in shear. FIG. 9 schematically illustrates an example of the central tubular structure 104 that is configured to hold four satellites 102. In this example, each frame member 108 includes four shear connectors 120 of four sets 170 of the shear connectors 120. FIG. 10 schematically illustrates an example of the central tubular structure 104 that is configured to hold five satellites 102. In this example, each frame member 108 includes five shear connectors 120 or five sets 170 of the shear connectors 120.

In examples in which the shear connectors 120 connect two or more of the bulkheads 116 of a given satellite 102 and two or more corresponding frame members 108 of the central tubular structure 104 together, the shear connectors 120 provide a moment connection between the satellite 102 and the central tubular structure 104. In examples in which the set 170 of the shear connectors 120 connects the bulkhead 116 of a given satellite 102 to the corresponding frame member 108 of the central tubular structure 104, the set 170 of the shear connectors 120 provides a moment connection between the satellite 102 and the central tubular structure 104. As used herein, the term "moment connection" has its ordinary meaning as known to those skilled in the art and refers to a connection or joint that allows for the transfer of bending moment forces between the satellite 102 and the central tubular structure 104 and that prevents rotational movement of the satellite 102 relative to the central tubular structure 104.

Referring to FIG. 12, in an example, the plurality of bulkheads 116 of each one of the plurality of satellites 102 includes a first closeout bulkhead 122. The first closeout bulkhead 122 is located at, or forms, the first end 128 of the satellite 102. The plurality of bulkheads 116 also includes a second closeout bulkhead 124, opposite to the first closeout bulkhead 122. The second closeout bulkhead 124 is located at, or forms, the second end 130 of the satellite 102. The plurality of bulkheads 116 also includes at least one interior bulkhead 126. The interior bulkhead 126 is located between the first closeout bulkhead 122 and the second closeout bulkhead 124. In the example shown in FIG. 12, the satellite 102 includes three interior bulkheads 126, however, in other examples, the satellite 102 may include any number of interior bulkheads 126.

Referring to FIGS. 7 and 12, in an example, a first one of the sets 170 of the plurality of shear connectors 120 couples the first closeout bulkhead 122 (FIG. 12) to a first one 134 (FIG. 7) of the plurality of frame members 108. A second one of the sets 170 of the plurality of shear connectors 120 couples the second closeout bulkhead 124 (FIG. 12) to a second one 138 (FIG. 7) of the plurality of frame members 108. A third one of the sets 170 of the plurality of shear connectors 120 couples the interior bulkhead 126 (FIG. 12) to a third one 142 (FIG. 7) of the plurality of frame members 108. Additional sets 170 of the plurality of shear connectors 120 couples additional ones of the interior bulkheads 126 to additional ones of the plurality of frame members 108.

In an example, the number of frame members 108 of the central tubular structure 104 is equal to or greater than the number of bulkheads 116 of the satellite 102. As an example, illustrated in FIG. 4, each satellite 102 includes four bulkheads 116 and the central tubular structure 104 includes at least four frame members 108. As another example, illustrated in FIGS. 7 and 12, the satellite 102 includes five bulkheads 116 (FIG. 12) and the central tubular structure 104 includes at least five frame members 108 (FIG. 7). Examples of the central tubular structure 104 having any other suitable number of frame members 108 and examples of the satellite 102 having any other suitable number of bulkheads 116 are also contemplated.

The number of frame members 108 of the central tubular structure 104 being equal to the number of bulkheads 116 of the satellite 102 and each one of the bulkheads 116 being coupled to a corresponding one of the frame members 108 increases the overall stiffness of the system (e.g., the satellite dispenser 100) and provides a system that ensures that the first couple modes of the system involve the entire structure (e.g., the central tubular structure 104 and the plurality of satellites 102), such as in a bending mode with a fixed boundary condition at a base of the central tubular structure 104 (e.g., a conical dispenser fitting 148). Furthermore, the number of frame members 108 of the central tubular structure 104 being equal to the number of bulkheads 116 of the satellite 102 and each one of the bulkheads 116 being coupled to a corresponding one of the frame members 108 also provides structural support for the entire length of the satellite 102 so that a mode shape of the overall system (e.g., the central tubular structure 104 and the plurality of satellites 102) rotates about a boundary condition as a single, cohesive unit and prevents inter-satellite mode shapes, which is undesirable.

Referring to FIGS. 4-6, 11, and 12, in an example, one of the shear connectors 120 is located at each corner of the bulkhead 116 (e.g., each shear connector 120 of the set 170 is located at one of the two respective corners of the connecting edge of the bulkhead 116). Other configurations and/or arrangements of the shear connectors 120 along the connecting edge of the bulkhead 116 and/or around the perimeter of the frame member 108 are also contemplated.

Figure 13:
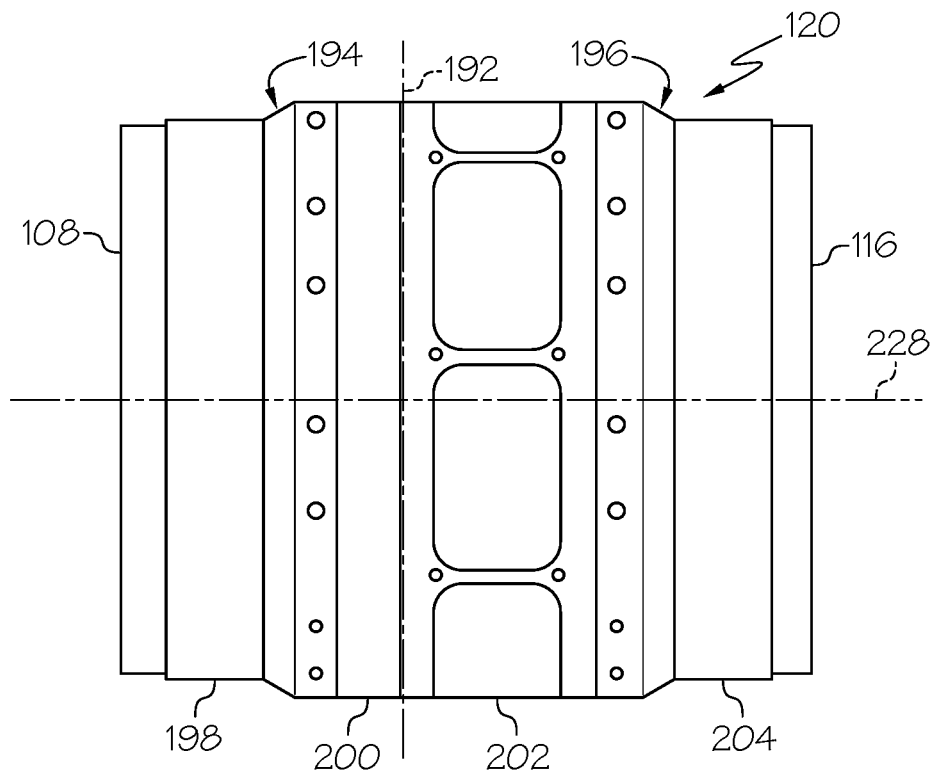
FIG. 13 is a schematic, side elevational view of an example of a shear connector.

FIG. 13 schematically illustrates an example of the shear connector 120. In an example, the connector first portion 194 of the shear connector 120 includes a shear plate 200. The shear plate 200 is coupled to the central tubular structure 104, such as to the frame member 108. The connector second portion 196 of the shear connector 120 includes a shear fitting 202. The shear fitting 202 is coupled to the satellite 102, such as to the bulkhead 116 of the satellite 102. The shear fitting 202 is coupled to the shear plate 200 in shear. The shear fitting 202 is selectively separable from the shear plate 200 along the plane of separation 192.

The shear plate 200 and the shear fitting 202 are coupled together to react to loads applied to the shear connector 120, including shear loads acting in directions along the plane of separation 192 and axial loads, bending loads, and/or torsional loads acting along a center axis 228 of the shear connector 120. For example, the shear plate 200 and the shear fitting 202 are appropriately coupled together to react to loads applied by the satellite 102 to the shear fitting 202 and to transfer such loads to the central tubular structure 104 through the shear plate 200.

In an example, the connector first portion 194 of the shear connector 120 includes a first interface fitting 198. The first interface fitting 198 is coupled to the central tubular structure 104. For example, the first interface fitting 198 is coupled to the frame member 108 of the central tubular structure 104. The shear plate 200 is coupled to the first interface fitting 198 opposite the central tubular structure 104. The first interface fitting 198 is configured to mate with the exterior of central tubular structure 104 and serves as a connection interface between the shear plate 200 and the central tubular structure 104.

In an example, the first interface fitting 198 is complementary to and accommodates at least a portion of the cross-sectional shape of the central tubular structure 104 or the frame member 108. The first interface fitting 198 may be coupled to the frame member 108 of the central tubular structure 104 in any one of various ways, such as by mechanical fasteners, adhesive bonding, co-curing of composite materials, or a combination thereof.

Figure 15:
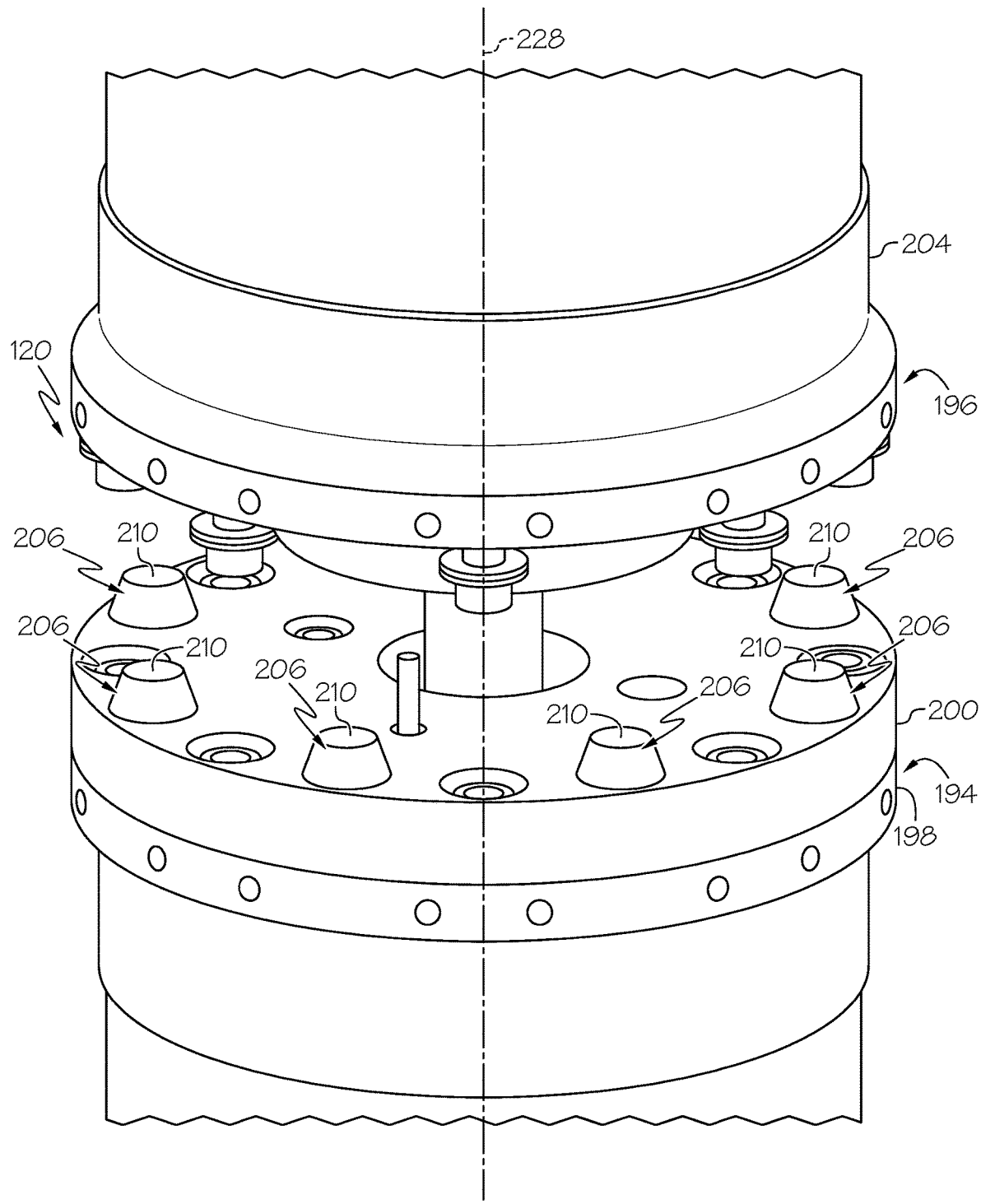
FIG. 15 is a schematic, perspective view of an example of the shear connector.
Figure 16:
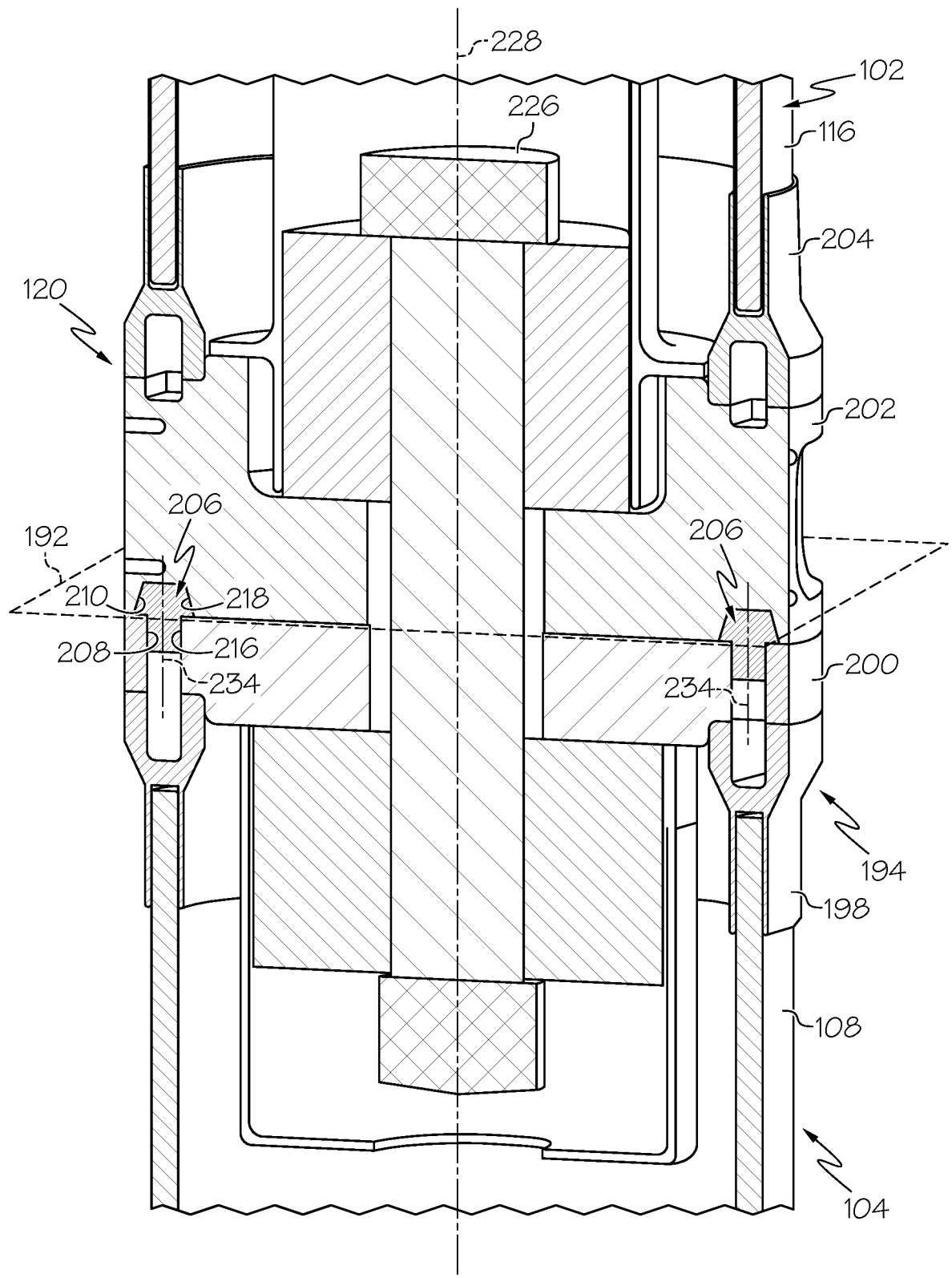
FIG. 16 is a schematic, sectional view of an example of the shear connector.
Figure 17:
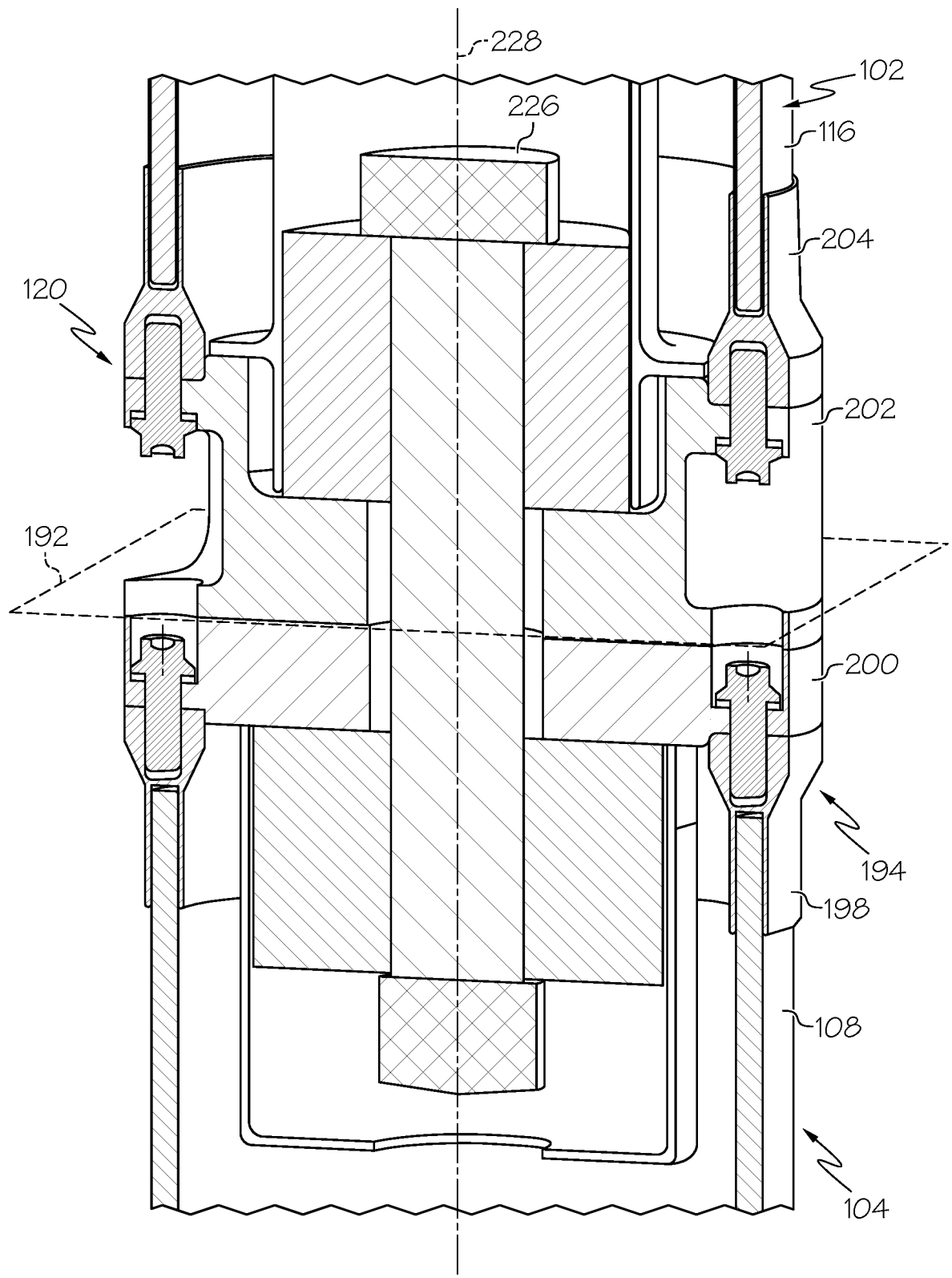
FIG. 17 is a schematic, sectional view of the example of the shear connector of FIG. 16.

The shear plate 200 may be coupled to the first interface fitting 198 in any one of various ways, such as by mechanical fasteners, adhesive bonding, co-curing of composite materials, or a combination thereof. The examples of the shear connector 120 illustrated in FIGS. 15-17 show the shear plate 200 and the first interface fitting 198 coupled together using a plurality of mechanical fasteners.

The shear plate 200, the first interface fitting 198, and the frame member 108 are appropriately coupled together to react to loads applied by the satellite 102 to the connector first portion 194 of the shear connector 120 and to transfer such loads to the central tubular structure 104 through the connector second portion 196 of the shear connector 120. Examples of such loads include shear loads, axial loads, bending loads, and/or torsional loads.

In an example, the connector second portion 196 of the shear connector 120 includes a second interface fitting 204. The second interface fitting 204 is coupled to the satellite 102. For example, the second interface fitting 204 is coupled to the bulkhead 116 of the satellite 102. The shear fitting 202 is coupled to the second interface fitting 204 opposite the satellite 102. The second interface fitting 204 is configured to mate with an edge of bulkhead 116 and serves as a connection interface between the shear fitting 202 and satellite 102.

In an example, the second interface fitting 204 is complementary to and accommodates at least a portion of the profile shape of the edge of the bulkhead 116. The second interface fitting 204 may be coupled to the bulkhead 116 of the satellite 102 in any one of various ways, such as by mechanical fasteners, adhesive bonding, co-curing of composite materials, or a combination thereof.

The shear fitting 202 may be coupled to the second interface fitting 204 in any one of various ways, such as by mechanical fasteners, adhesive bonding, co-curing of composite materials, or a combination thereof. The examples of the shear connector 120 illustrated in FIGS. 15-17 show the shear fitting 202 and the second interface fitting 204 coupled together using a plurality of mechanical fasteners.

The shear fitting 202, the second interface fitting 204, and the bulkhead 116 are appropriately coupled together to react to loads applied by connector first portion 194 of the shear connector 120, from the satellite 102, and to transfer such loads to the central tubular structure 104. Examples of such loads include shear loads, axial loads, bending loads, and/or torsional loads.

Figure 14:
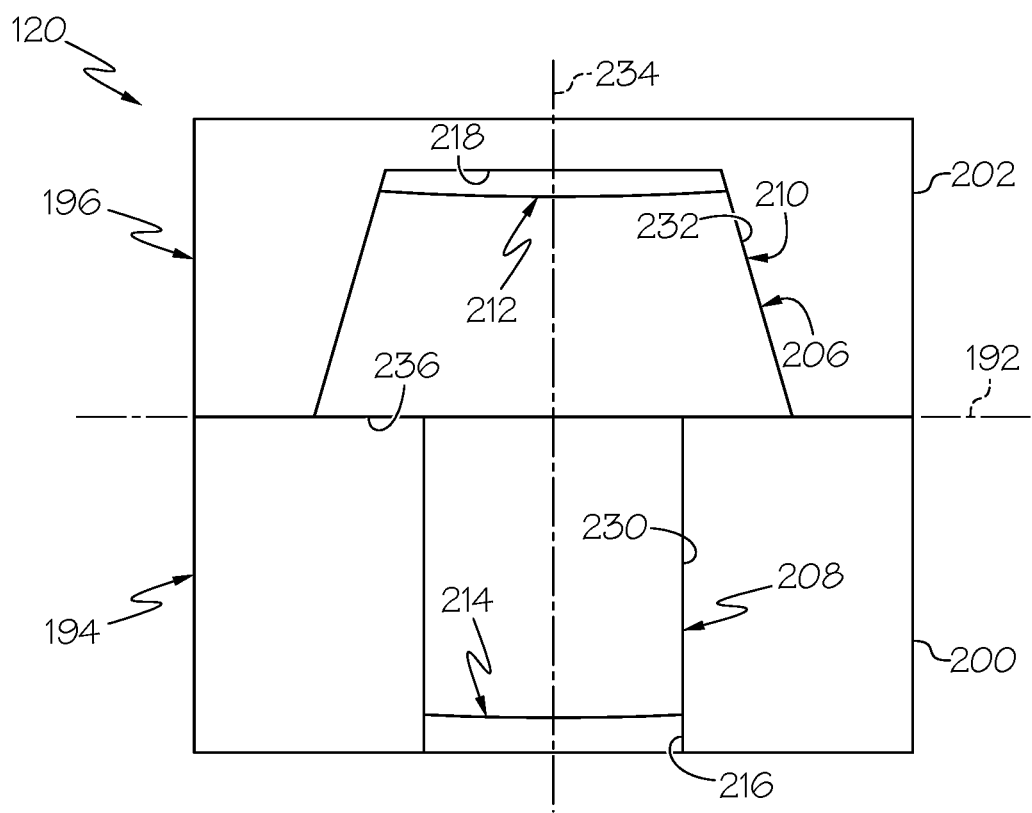
FIG. 14 is a schematic, side elevational view of an example of a shear pin of the shear connector.

FIG. 14 schematically illustrates an example of a portion of an interface between the connector first portion 194 and the connector second portion 196, such as, between the shear plate 200 and the shear fitting 202 of the shear connector 120. FIG. 15 schematically illustrates an example of a portion of the shear connector 120. In FIG. 15, the shear fitting 202 has been removed for clarity of illustration. In an example, the shear connector 120 includes at least one shear pin 206. The shear pin 206 is located between and is coupled to the connector first portion 194 and the connector second portion 196. For example, the shear pin 206 is located between and is coupled to the shear plate 200 and the shear fitting 202.

Referring to FIG. 15, in an example, the shear connector 120 includes a plurality of the shear pins 206. Each one of the plurality of shear pins 206 is located between and is coupled to the connector first portion 194 and the connector second portion 196. For example, each one of the plurality of shear pins 206 is located between and is coupled to the shear plate 200 and the shear fitting 202. Throughout the present disclosure, the plurality of shear pins 206 may be referred to collectively as shear pins 206 and individually as shear pin 206. In an example, the shear pins 206 are arranged about the center axis 228 of the shear connector 120.

Referring to FIG. 14, in an example, the shear pin 206 is configured to engage both the shear plate 200 and the shear fitting 202. The shear pin 206 is configured to react to shear loads in directions along the plane of separation 192 and to transfer the shear loads between the shear plate 200 and the shear fitting 202. Two or more of the shear pins 206, acting collectively, are also configured to react to torsional loads acting about the center axis 228 of the shear connector 120.

In an example, the shear pin 206 includes a first end 212 and a second end 214, opposite to the first end 212, and has a center axis 234 that extends through the first end 212 and the second end 214. In an example, the shear pin 206 includes a pin first portion 208 that extends along the center axis 234 from the first end 212. The shear pin 206 also includes a pin second portion 210 that extends along the center axis 234 from the second end 214 to the pin first portion 208.

In an example, the shear plate 200 includes at least one shear-plate aperture 216. For example, the shear plate 200 includes a plurality of shear-plate apertures 216. Throughout the present disclosure, the plurality of shear-plate apertures 216 may be referred to collectively as shear-plate apertures 216 and individually as shear-plate aperture 216.

In an example, the shear fitting 202 includes at least one shear-fitting aperture 218. For example, the shear fitting 202 includes a plurality of shear-fitting apertures 218. Throughout the present disclosure, the plurality of shear-fitting apertures 218 may be referred to collectively as shear-fitting apertures 218 and individually as shear-fitting aperture 218.

Referring to FIGS. 13 and 14, in an example, with the shear fitting 202 connected to the shear plate 200, the shear-plate apertures 216 and the shear-fitting apertures 218 are aligned with each other and each one of the shear pins 206 is disposed within a corresponding aligned pair of the shear-plate apertures 216 and the shear-fitting apertures 218. For example, as illustrated in FIG. 14, the pin first portion 208 of the shear pin 206 is received within the shear-plate aperture 216 and the pin second portion 210 of the shear pin 206 is received within the shear-fitting aperture 218. With the shear fitting 202 connected to the shear plate 200, an intersection, or junction, between the pin first portion 208 and the pin second portion 210 of the shear pin 206 lies along the plane of separation 192.

In an example, with the shear fitting 202 connected to the shear plate 200, the center axis 234 of the shear pin 206 (FIG. 14) is approximately parallel to the center axis 228 of the shear connector 120 (FIG. 13). Both the center axis 234 of the shear pin 206 and the center axis 228 of the shear connector 120 are approximately perpendicular to the longitudinal axis 106 of the central tubular structure 104 and the longitudinal axis 168 of the satellite 102 (FIG. 4).

Referring to FIG. 14, the shear-plate aperture 216 has a cross-sectional shape that is complementary to the pin first portion 208 of the shear pin 206. The pin first portion 208 and the shear-plate aperture 216 are geometrically dimensioned within appropriate tolerances so that a pin first surface 230 of the pin first portion 208 is in contact with an inner surface of the shear-plate aperture 216. For example, the pin first portion 208 is received within the shear-plate aperture 216 with a transition fit (e.g., the shear-plate aperture 216 is fractionally smaller than the pin first portion 208 and mild force is required to assemble and/or disassemble) or an interference fit (e.g., the shear-plate aperture 216 is smaller than the pin first portion 208 and high force and/or heat is required to assemble and/or disassemble).

The shear-fitting aperture 218 has a cross-sectional shape that is complementary to the pin second portion 210 of the shear pin 206. The pin second portion 210 and the shear-fitting aperture 218 are geometrically dimensioned within appropriate tolerances so that a pin second surface 232 of the pin second portion 210 is in contact with an inner surface of the shear-fitting aperture 218. For example, the pin second portion 210 is received within the shear-fitting aperture 218 with a transition fit (e.g., the shear-fitting aperture 218 is fractionally smaller than the pin second portion 210 and mild force is required to assemble and/or disassemble).

The shear pin 206 is configured to transfer shear loads from the shear fitting 202 to the shear plate 200 and, thus, from the satellite 102 to the central tubular structure 104 through the shear connector 120. In an example, with the shear fitting 202 connected to the shear plate 200 and the shear pin 206 disposed within a corresponding pair of the shear-plate aperture 216 and the shear-fitting aperture 218, shear forces, or loads, are transferred between the shear fitting 202 and the shear plate 200 by the shear pin 206. For example, shear forces are transferred between the shear fitting 202 and the shear plate 200 along the pin first surface 230 of the pin first portion 208 and along the pin second surface 232 of the pin second portion 210.

The shear pin 206 is also configured to enable separation of the shear fitting 202 from the shear plate 200 when the satellite dispenser 100 is in its intended orbit for deployment so that the satellite 102 can be selectively released from the central tubular structure 104. In an example, following release of the satellite 102 from the central tubular structure 104, the pin first portion 208 stays connected to the shear plate 200, within the shear-plate aperture 216, and shear fitting 202 moves away from the shear pin 206, withdrawing the pin second portion 210 from the shear-fitting aperture 218.

In the illustrated examples, the shear pins 206 are shown having a circular cross-sectional shape, viewed along the center axis 234 of the shear pin 206. However, in other examples, the shear pins 206 may have any one of various cross-sectional shapes, viewed along the center axis 234, such as square, rectangular, elliptical, and other polygonal shapes.

The pin first portion 208 of the shear pin 206 has a first cross-sectional dimension, viewed along the center axis 234 of the shear pin 206 (e.g., first diameter for a circular cross-section). The pin second portion 210 of the shear pin 206 has a second cross-sectional dimension, viewed along the center axis 234 of the shear pin 206 (e.g., a second diameter for a circular cross-section). In an example, as illustrated in FIG. 14, the second cross-sectional dimension of the pin second portion 210 is larger than the first cross-sectional dimension of the pin first portion 208. As such, the pin second portion 210 of the shear pin 206 forms a shoulder 236 that contacts a surface of the shear plate 200 surrounding the shear-plate aperture 216.

Referring to FIG. 14, in an example, the pin first portion 208 of the shear pin 206 has a cylindrical shape and the shear-plate aperture 216 is a cylindrical aperture. In other words, the pin first portion 208 of each one of the plurality of shear pins 206 and the plurality of shear-plate apertures 216 have complementary cylindrical shapes.

In an example, the pin second portion 210 of the shear pin 206 has a frustoconical shape (e.g., a truncated cone) that tapers from the shoulder 236 to the second end 214 of the shear pin 206 and the shear-fitting aperture 218 is a frustoconical aperture. In other words, the pin second portion 210 of each one of the plurality of shear pins 206 and the plurality of shear-fitting apertures 218 have complementary frustoconical shapes. The complementary frustoconical shapes of the pin second portion 210 and the shear-fitting aperture 218 prevent the shear fitting 202 from binding with the pin second portion 210 when the shear fitting 202 separates from the shear plate 200 to release the satellite 102 from the central tubular structure 104.

In the illustrated examples, the shear connector 120 is shown having a circular cross-sectional shape, viewed along the center axis 228 of the shear connector 120. However, in other examples, the shear connector 120 may have any one of various cross-sectional shapes, viewed along the center axis 228, such as square, rectangular, elliptical, and other polygonal shapes.

In the illustrated examples, the shear pins 206 are shown being arranged along a circular pattern around the center axis 228 of the shear connector 120. However, in other examples, the shear pins 206 may be arranged in any one of various patterns, such as square, rectangular, elliptical, and other polygonal shapes.

FIGS. 16 and 17 schematically illustrate an example of the shear connector 120. In an example, the shear connector 120 includes releasable fastener 226. The releasably fastener 226 couples the shear fitting 202 and the shear plate 200 together and, thus, couples the connector second portion 196 of the shear connector 120 and the connector first portion 194 of the shear connector 120 connector. The releasable fastener 226 is configured to react to axial loads, bending loads, and/or torsional loads acting along the center axis 228 of the shear connector 120.

The releasable fastener 226 is configured to selectively release the shear fitting 202 from the shear plate 200 and, thus, selectively release the connector second portion 196 of the shear connector 120 from the connector first portion 194 of the shear connector 120, which, in turn, selectively releases a portion of the satellite 102 from the central tubular structure 104.

The releasable fastener 226 may include, or take the form of, any suitable fastening mechanism that is capable of being selectively releasable or selectively separable upon receiving a command signal to release the satellite 102 from the central tubular structure 104. In an example, the releasable fastener 226 includes, or takes the form of, a pyrotechnic separation bolt.

Accordingly, the functions of a shear continuity mechanism, a launch lock mechanism, and a launch release mechanism are incorporated into a single mechanism formed by the shear connector 120.

The illustrated examples show the releasable fastener 226 located at a center of the shear connector 120 and extending along the center axis 228 of the shear connector 120. However, in other examples, the relative location of the releasable fastener 226 may vary as needed. Further, the illustrated examples show the shear connector 120 having one releasable fastener 226. However, in other examples, the shear connector 120 may include more than one releasable fastener 226.

In an example, a connecting edge of the bulkhead 116 of the satellite 102 may be spaced radially outward from the corresponding frame member 108 of the central tubular structure 104 by the shear connector 120. In such an example, a shape of the connecting edge of the bulkhead 116 does not necessarily have to match a shape of the portion of the frame member 108, or the central tubular structure 104, to which it is coupled. For example, the shear connectors 120 may provide clearance between the connecting edge of the bulkhead 116 and the frame member 108 and form an offset between the satellite 102 and the central tubular structure 104.

In another example, the connecting edge of the bulkhead 116 may be proximate to (e.g., at or near) the frame member 108 or in contact with the skin 110 of the central tubular structure 104. In such an example, the connector first portion 194 of the shear connector 120 may be inset within the body of the frame member 108 and the connector second portion 196 of the shear connector 120 may be inset within the body of the bulkhead 116.

In the various illustrated examples, the bulkhead 116 is coupled to an associated one of the frame members 108 of the central tubular structure 104 by one or more of the shear connectors 120. Accordingly, the load path (a direction in which each consecutive load passes through connected members) of the overall system commences from bulkheads 116 of the satellites 102, through the shear connector 120, to the frame members 108 of the central tubular structure 104, to the skin 110 of the central tubular structure 104, and down to the base of the central tubular structure 104 (e.g., the fitting 148), ultimately transferring the total load of the system to a foundation support (e.g., the launch vehicle 112).

FIGS. 16 and 17 schematically illustrate cross-sections of an example of the shear connector 120 at different angular orientations about the center axis 228 of the shear connector 120. For example, the cross-section shown in FIG. 17 is "clocked" approximately 22.5 degrees from the cross-section shown in FIG. 16. FIG. 16 further illustrates an example of how the shear fitting 202 and the shear plate 200 are coupled together using the shear pins 206 (two shear pins 206 are shown) and the releasable fastener 226 to react to and carry the shear loads, axial loads, bending loads, and/or torsional loads experienced during launch and ascent. FIG. 17 further illustrates an example of how the shear plate 200 is coupled to the first interface fitting 198 and an example of how the shear fitting 202 is coupled to the second interface fitting 204 to react to and carry the shear loads, axial loads, bending loads, and/or torsional loads experienced during launch and ascent.

Figure 18:
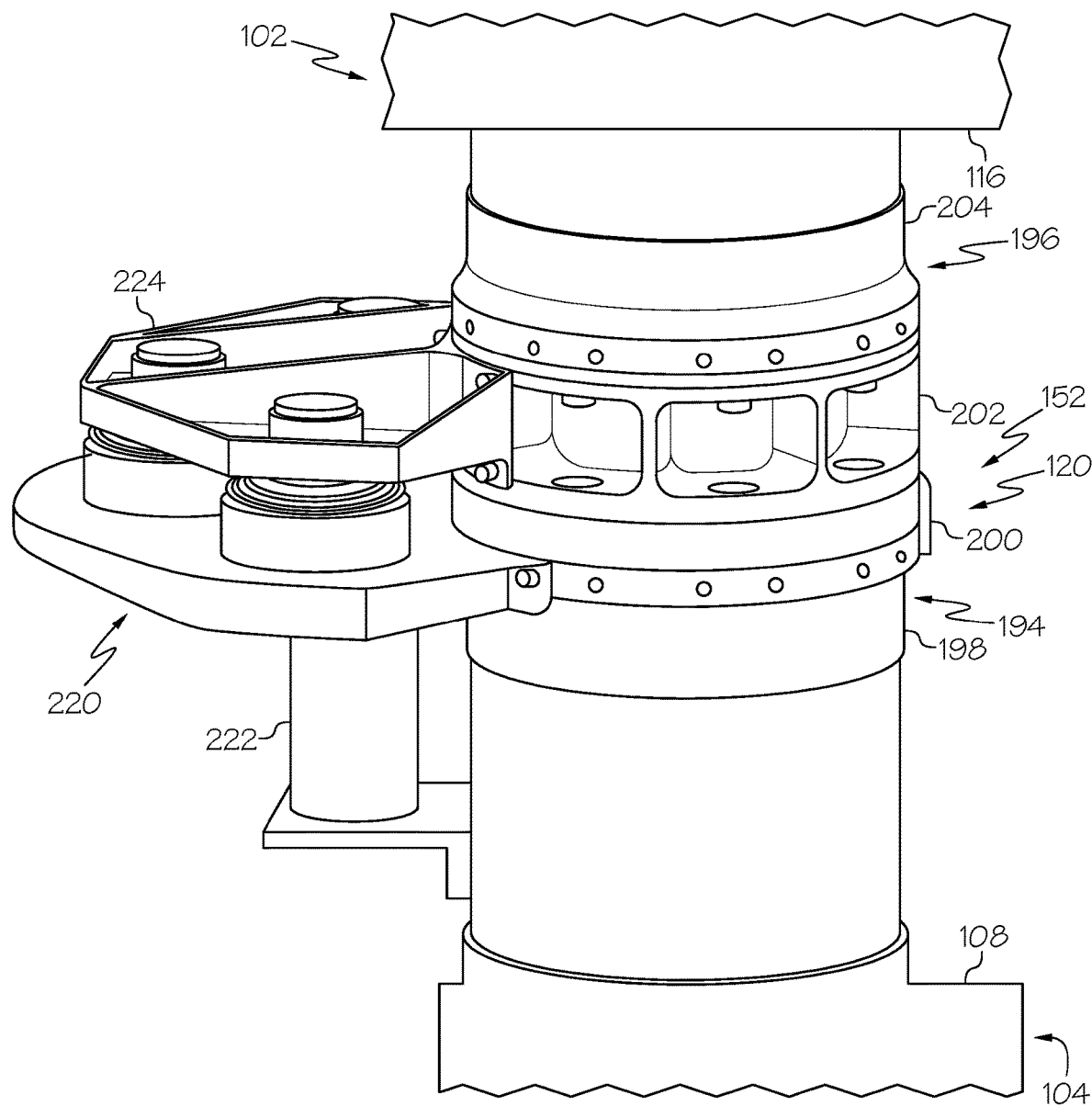
FIG. 18 is a schematic, perspective view of an example of the shear connector.
Figure 19:
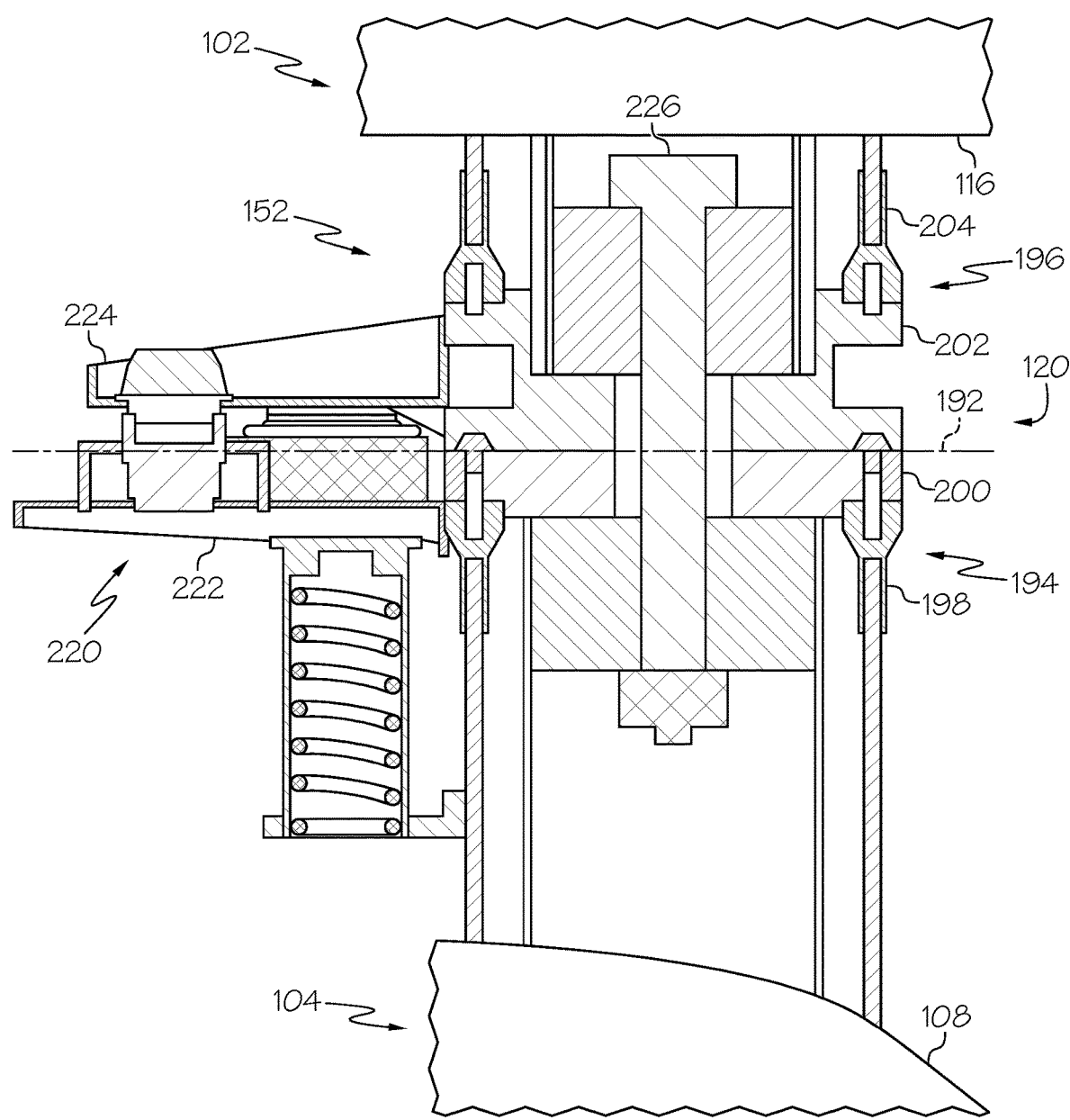
FIG. 19 is a schematic, sectional view of the example of the shear connector of FIG. 18.

FIGS. 18 and 19 schematically illustrate examples of the shear connector 120. In an example, the shear connector 120 also includes a push-off assembly 220. The push-off assembly 220 is configured to push the satellite 102 radially outward from the central tubular structure 104 following separation of the shear fitting 202 from the shear plate 200 and release of the satellite 102 from the central tubular structure 104.

In an example, the push-off assembly 220 includes a first portion 222 that is coupled to the connector first portion 194 of the shear connector 120, such as to the first interface fitting 198 and/or the shear plate 200. The push-off assembly 220 also includes a second portion 224 that is coupled to the connector second portion 196 of the shear connector 120, such as to the shear fitting 202 and/or the second interface fitting 204. Other coupling configurations and/or arrangements of the first portion 222 and the second portion 224 of the push-off assembly 220 are also contemplated. For example, the first portion 222 of the push-off assembly 220 may be coupled to the central tubular structure 104 and the second portion 224 of the push-off assembly 220 may be coupled to the satellite 102.

In an example, the push-off assembly 220 also includes a biasing mechanism that is configured to bias the second portion 224 of the push-off assembly 220 away from the first portion 222 of the push-off assembly 220. In an example, the biasing mechanism is a spring housed within a spring housing of the first portion 222 of the push-off assembly 220.

In an example, the push-off assembly 220 also includes at least one locking connector that is configured to hold the first portion 222 of the push-off assembly 220 and the second portion 224 of the push-off assembly 220 together until receiving a command to disengage. Upon disengagement of the locking connector and separation of the shear fitting 202 from the shear plate 200, the biasing mechanism pushes the second portion 224 of the push-off assembly 220 away from the first portion 222 of the push-off assembly 220, which, in turn, pushes the satellite 102 away from the central tubular structure 104. In an example, the locking connectors are electrically controlled connectors.

Figure 20:
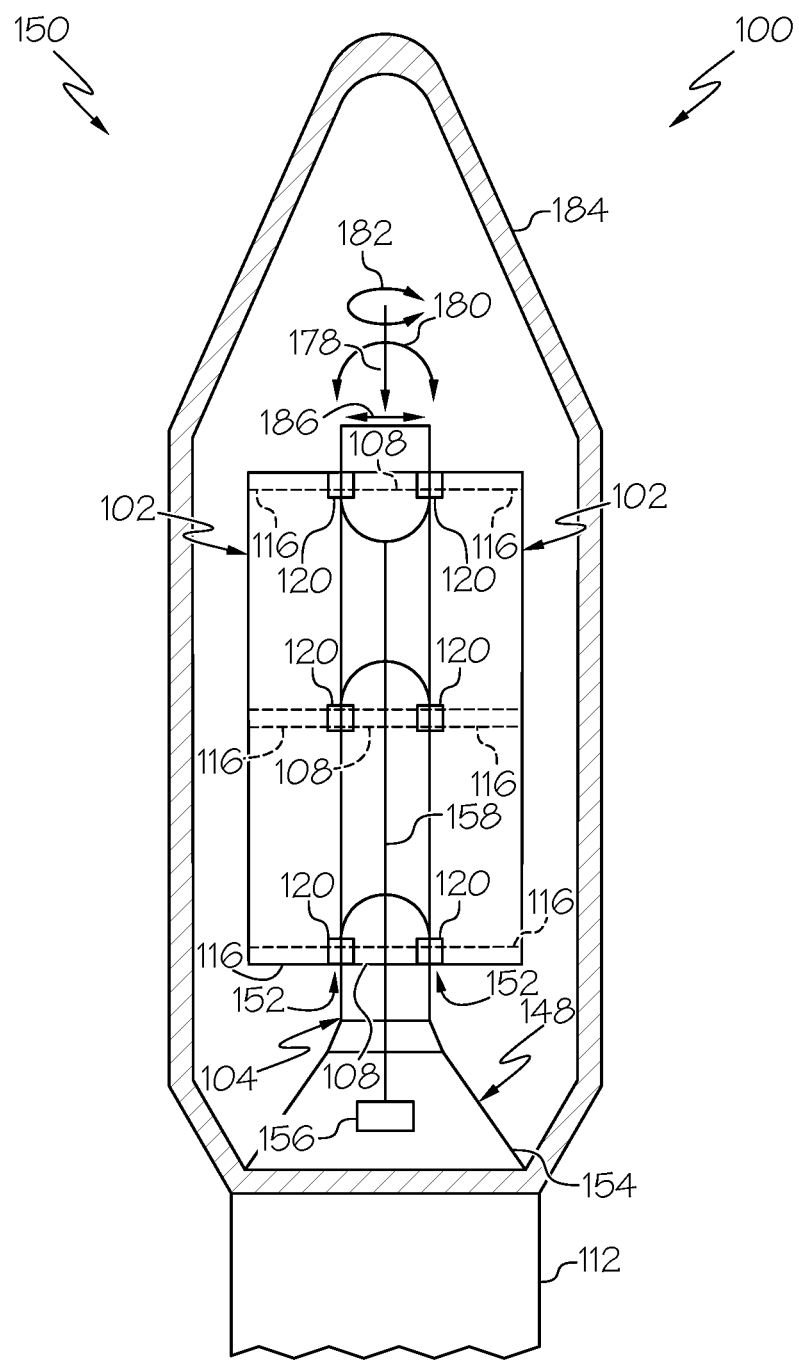
FIG. 20 is a schematic, side elevational view, in partial section, of an example of the satellite dispenser.

FIG. 20 schematically illustrates an example of the satellite dispenser 100. In FIG. 20, each one of the plurality of satellites 102 is shown as an empty body without the various electronic, electrical, optical, and mechanical components for clarity of illustration. The satellite dispenser 100 is mounted to an upper end of the launch vehicle 112, such as a launch rocket, for launching the satellites 102 into orbit. The satellite dispenser 100 includes a fitting 148. The fitting 148 is coupled to the central tubular structure 104, at a proximal (or lower) end of the central tubular structure 104. The fitting 148 is configured to interface with the launch vehicle 112. In an example, the fitting 148 includes, or takes the form of, a conical adapter 154 that is coupled to the launch vehicle 112.

In an example, the satellite dispenser 100 also includes a control module 156. The control module 156 may be contained within the central tubular structure 104 or within the fitting 148. The control module 156 is in electrical communication with each one of the shear connectors 120 and provides power and control signals to the satellite dispenser 100 for releasing the satellites 102.

In an example, the control module 156 is in electrical communication with the releasable fastener 226 and is configured to supply a command signal that initiates separation of the shear fitting 202 from the shear plate 200 (e.g., a pyrotechnic action that separates the releasable fastener 226 from the shear plate 200 and/or the shear fitting 202). The control module 156 may also be in electrical communication with the push-off assembly 220 and is configured to supply a command signal that releases the locking connectors.

In an example, the fitting 148 also contains a propulsion unit (not shown) for maneuvering the satellite dispenser 100 while in orbit during deployment of the satellites 102 into their appropriate respective orbit. In this example, the control module 156 is also in electrical communication with the propulsion unit and provides control signals for maneuvering the satellite dispenser 100.

In another example, the launch vehicle 112 maneuvers the satellite dispenser 100 while in orbit during deployment of the satellites 102 into their appropriate respective orbit. In this example, the launch vehicle 112 may provide power and control signals for releasing the satellites 102 such that an independent control module 156 and propulsion unit are not required.

In an example, the satellite dispenser 100 includes a wiring harness 158 that is coupled to the shear connectors 120 of the shear connections 152 between each satellite 102 and the central tubular structure 104. The wiring harness 158 includes wiring, terminals, and/or connectors and extends through a hollow interior 160 of the central tubular structure 104. In an example, the wiring harness 158 is coupled to the control module 156 for transferring power and/or control signals to the shear connectors 120. In another example, the wiring harness 158 is coupled to a power and control module of the launch vehicle 112 for transferring power and/or control signals to the shear connectors 120.

Additionally, the hollow interior 160 of the central tubular structure 104 enables access to the wiring harness 158, the shear connectors 120, and/or the satellites 102 from within the central tubular structure 104.

Figure 21:
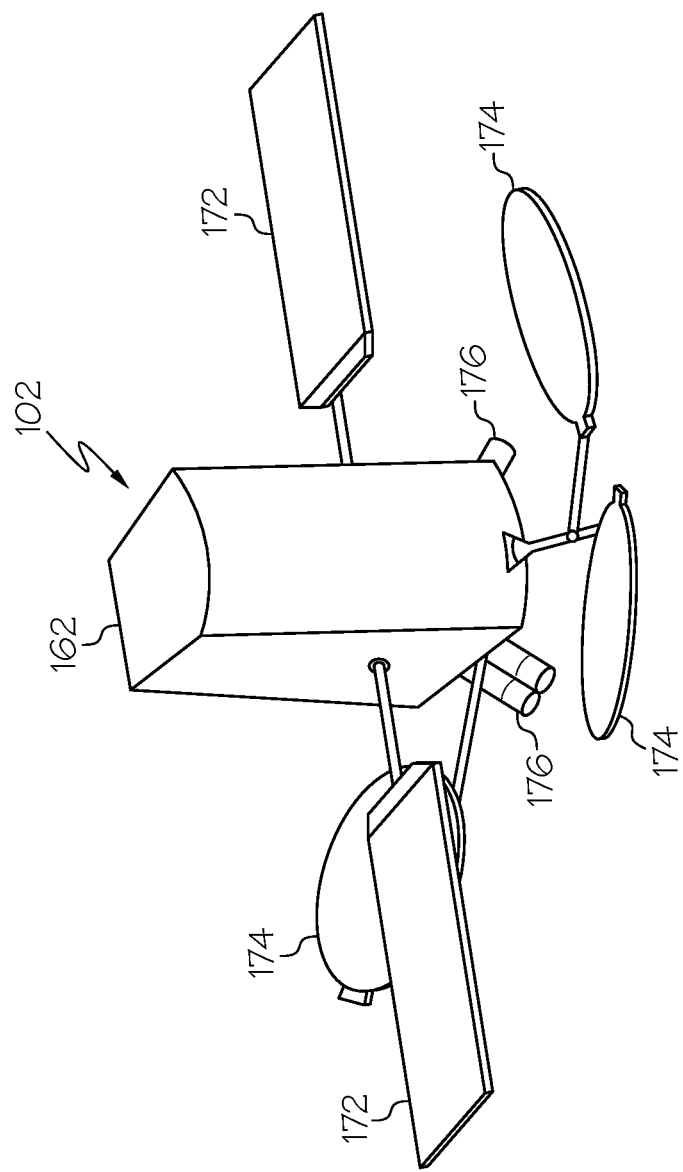
FIG. 21 is schematic, perspective view of an example of the satellite.

FIG. 21 schematically illustrates an example of one of the satellites 102. The satellite 102 shown in FIG. 21 is representative of any one or each one of the plurality of satellites 102 that are coupled to the central tubular structure 104 (FIGS. 1-4). In an example, the satellite 102 includes at least one solar panel 172 and at least one antenna 174. The solar panel 172 and the antenna 174 are mounted to the body 162 and structurally supported by the underlying frame 164 (FIG. 12). The solar panel 172 and the antenna 174 are deployable once the satellite 102 is positioned in its intended orbit. The satellite 102 may also include various fittings and booms for coupling and deploying the solar panel 172 and the antenna 174. The satellite 102 also includes at least one thruster 176 mounted to the body 162. The satellite 102 may also include one or more additional payload equipment panels, thermal radiators, and various other electronic, electrical, optical, mechanical, and other operational components (not explicitly shown in FIG. 21).

Figure 22:
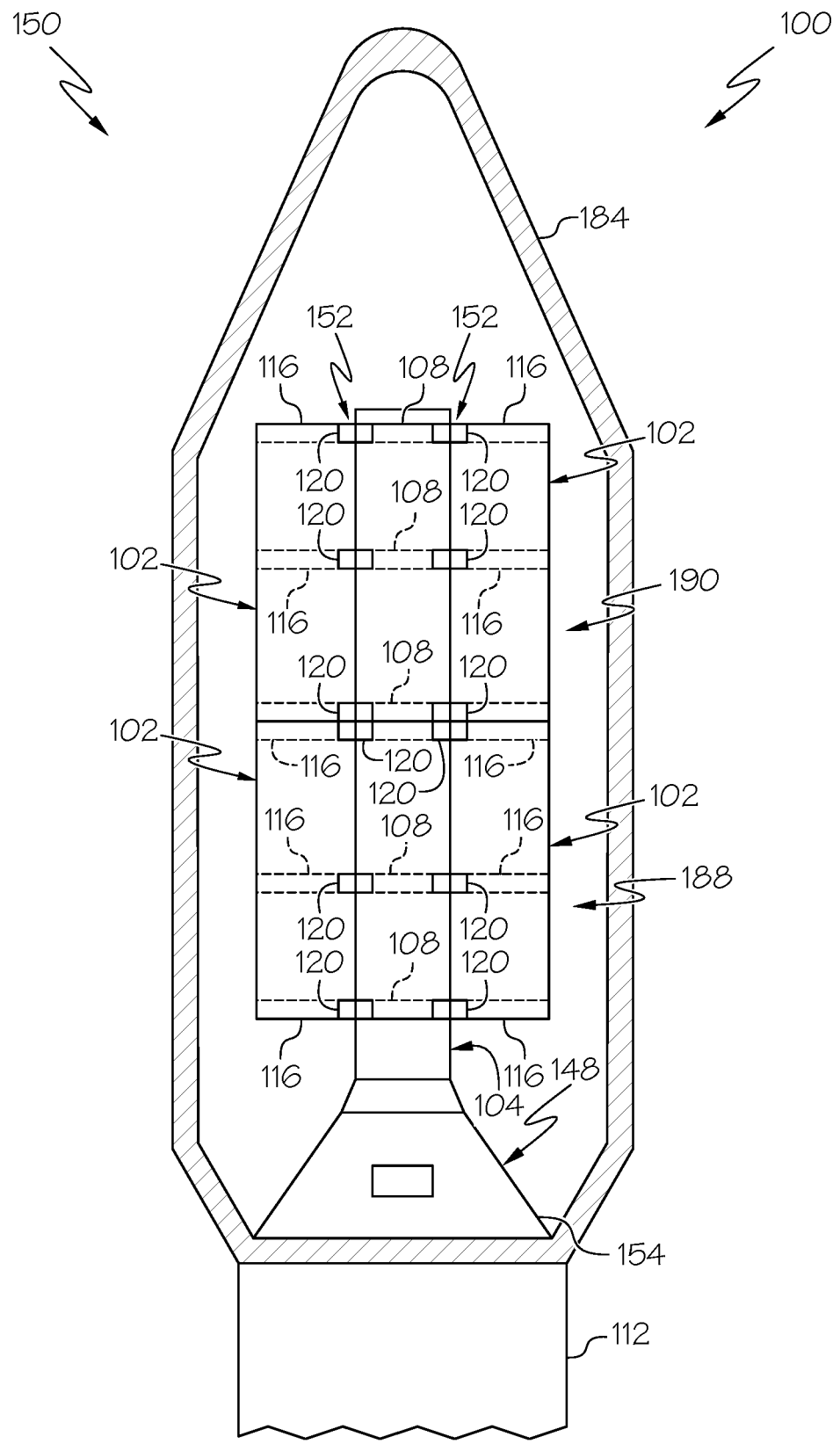
FIG. 22 is schematic, side elevational view, in partial section, of an example of the satellite dispenser.

FIG. 22 schematically illustrates another example of the satellite dispenser 100. In FIG. 22, each one of the plurality of satellites 102 is shown as an empty body without the various electronic, electrical, optical, and mechanical components for clarity of illustration. The plurality of satellites 102 includes a first set 188 (e.g., a lower set) of two or more satellites 102 and a second set 190 (e.g., an upper set) of two or more satellites 102. Each satellite 102 of the first set 188 of satellites 102 is coupled to a lower portion of the central tubular structure 104 by the shear connectors 120. Each satellite 102 of the second set 190 of satellites 102 is coupled to an upper portion of the central tubular structure 104 by the shear connectors 120. Additional sets of satellites 102 are also contemplated.

Referring to FIGS. 3, 20, and 22, in an example, the satellite dispenser 100 includes a fairing 184. The fairing 184 is coupled to the upper end of the launch vehicle 112 and surrounds the central tubular structure 104 and the plurality of satellites 102. The fairing 184 serves as a protecting shroud surrounding the central tubular structure 104 and the satellites 102 and provides a streamlined shape to the satellite dispenser 100. The fairing 184 is releasable from the launch vehicle 112. In an example, once the satellite dispenser 100 is in its intended orbit for deployment of the satellites 102, the fairing 184 separates or releases from the launch vehicle 112 and is allowed to fall away, thereby exposing the central tubular structure 104 and the satellites 102.

Referring generally to FIGS. 1, 2, and 4-19 and particularly to FIGS. 3, 20, and 22, also disclosed is a spacecraft 150. The spacecraft 150 includes the launch vehicle 112 and the satellite dispenser 100, coupled to the launch vehicle 112. As described by way of the examples provided herein, the satellite dispenser 100 includes the central tubular structure 104 and the plurality of satellites 102 arranged around the central tubular structure 104. The plurality of shear connectors 120 couple the central tubular structure 104 and the plurality of satellites 102 together in shear continuity. Each one of the plurality of shear connectors 120 is separable with the central tubular structure 104 or one of the plurality of satellites 102 to selectively release the plurality of satellites from the central tubular structure 104.

Figure 23:
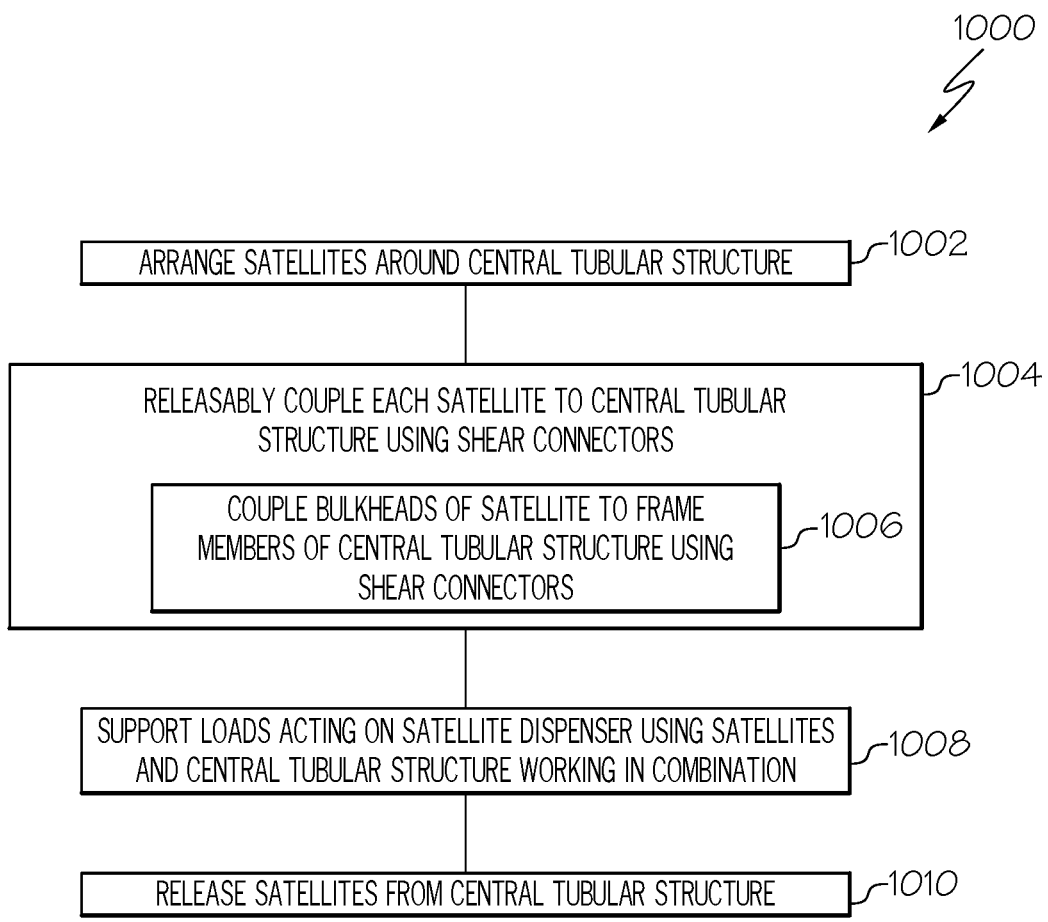
FIG. 23 is a flow diagram depicting an example of the disclosed method of supporting a plurality of satellites.

FIG. 23 depicts an example of the disclosed method 1000 of supporting the plurality of satellites 102. Implementation of the disclosed method 1000 uses the examples of the satellite dispenser 100 described and illustrated herein. In an example, the method includes transporting the satellite dispenser 100 to a launch site. In an example, the method includes launching satellite dispenser 100, coupled to the launch vehicle 112. The launch vehicle 112 is configured to place the satellite dispenser 100 in orbit above a planetary body (not shown), such as above the Earth (not shown). In an example, the method includes dispensing, or deploying, each one of the plurality of satellites 102 into their respective intended orbit.

In an example, the method 1000 includes a step of (block 1002) arranging the plurality of satellites 102 around the central tubular structure 104 (about the longitudinal axis 106 of the central tubular structure 104). The method 1000 also includes a step of (block 1004) releasably coupling each one of the plurality of satellites 102 to the central tubular structure 104 using the plurality of shear connectors 120. The plurality of satellites 102 and the central tubular structure 104 are coupled together by the shear connectors 120 so that the central tubular structure 104 and the plurality of satellites 102 are in shear continuity.

In an example, according to the method 1000, the step of (block 1004) releasably coupling each one of the plurality of satellites 102 to the central tubular structure 104 using the plurality of shear connectors 120 includes a step of (block 1006) coupling the plurality of bulkheads 116 of each one of the plurality of satellites 102 to the plurality of frame members 108 of the central tubular structure 104 using the plurality of shear connectors 120. For example, according to the method 1000, the step of (block 1004) releasably coupling each one of the plurality of satellites 102 to the central tubular structure 104 using the plurality of shear connectors 120 includes a step of coupling each one of the plurality of bulkheads 116 of each one of the plurality of satellites 102 to a corresponding one of the plurality of frame members 108 of the central tubular structure 104 using the set 170 of the plurality of shear connectors 120.

In an example, the method 1000 includes a step of (block 1008) supporting loads acting on the satellite dispenser 100 using the plurality of satellites 102 and the central tubular structure 104 working together in combination. Examples of the loads acting on the satellite dispenser 100 include shear loads 186, axial loads 178, bending loads 180, and/or torsional loads 182 (FIG. 20). In an example, according to the method 1000, shear loads 186 are transferred from the satellite 102 to the central tubular structure 104 through the shear connectors 120, for example, from the shear fitting 202 to the shear plate 200 by the plurality of shear pins 206.

The central tubular structure 104 and the satellites 102 acting together to carry the shear loads 186, the axial loads 178, the bending loads 180, and the torsional loads 182 advantageously provides a lightweight structural solution for a launch configuration of the plurality of satellites 102 using a single launch vehicle 112. In this regard, the central tubular structure 104 and each one of the satellites 102 may advantageously be provided in a lower mass configuration, while providing a higher strength and stiffness to satellite dispenser 100 and enabling the central tubular structure 104 and each one of the satellites 102 to share the combined mass of the satellite dispenser 100 and the combined loads.

In an example, once the launch vehicle 112 has reached the intended dispensing orbit of the satellites 102, the satellite dispenser 100 separates from the launch vehicle 112 and maneuvers autonomously to the deployment destination of each satellite 102. In this example, the satellite dispenser 100 operates as an autonomous dispenser vehicle utilizing its own power source, propulsion unit, and control module 156 (FIG. 1). In another example, the launch vehicle 112 (e.g., an upper stage of a launch rocket) takes on the function of the dispensing vehicle for maneuvering the satellite dispenser 100 into the intended dispensing positions and providing the necessary power and control signals for deployment of the satellites 102 from the satellite dispenser 100.

In either of the above examples, the shear connectors 120 connecting each one of the satellites 102 to the central tubular structure 104 are released and separate along the plane of separation 192 before the corresponding satellite 102 is to be dispensed so that the satellite 102 is released and separates from the central tubular structure 104.

In an example, the method 1000 includes a step of (block 1010) selectively releasing each one of the plurality of satellites 102 from the central tubular structure 104. In an example, according to the method 1000, the step of (block 1010) releasing the satellites 102 from the central tubular structure 104 includes a step of releasing the releasable fastener 226 and separating the shear fitting 202 from the shear plate 200.

Figure 24:
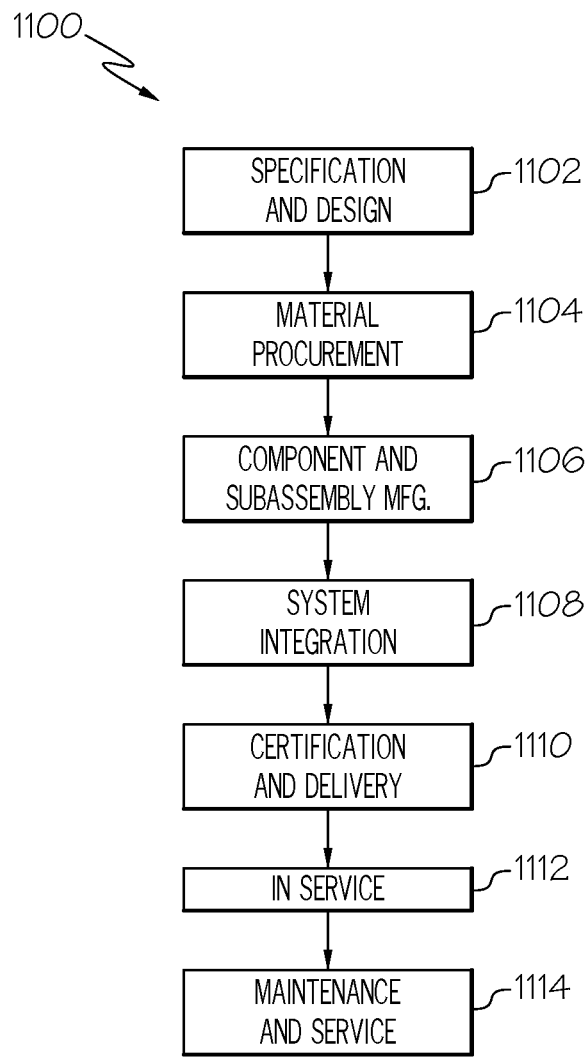
FIG. 24 is a flow diagram of a spacecraft manufacturing and service methodology.
Figure 25:
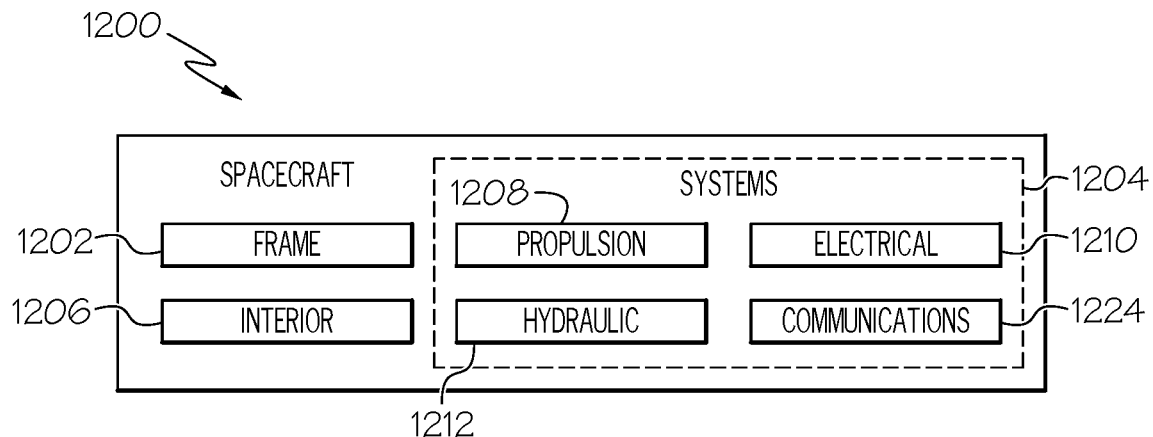
FIG. 25 is a block diagram of a spacecraft.

Referring now to FIGS. 24 and 25, examples of the satellite dispenser 100 and the method 1000 may be used in the context of a spacecraft manufacturing and service method 1100, as shown in the flow diagram of FIG. 24 and spacecraft 1200, as shown in FIG. 25.

FIG. 25 is an illustrative example of the spacecraft 1200. The spacecraft 1200 is an example of the spacecraft 150 (FIGS. 3, 20, and 22). The spacecraft 1200 includes a frame 1202 and a plurality of high-level systems 1204. The frame 1202 may include the structure of the launch vehicle 112 and/or the structure of the satellite dispenser 100. The spacecraft 1200 also includes an interior 1206. Examples of the high-level systems 1204 include one or more of a propulsion system 1208, an electrical system 1210, a hydraulic system 1212, and a communications system 1224. In other examples, the spacecraft 1200 may include any number of other types of systems. The spacecraft 1200 illustrated in FIG. 25 is an example of a spacecraft used to launch and deploy a plurality of satellites using a single launch vehicle.

As illustrated in FIG. 24, during pre-production, the method 1100 may include specification and design of the spacecraft 1200 (block 1102) and material procurement (block 1104). During production of the spacecraft 1200, component and subassembly manufacturing (block 1106) and system integration (block 1108) of the spacecraft 1200 may take place. Thereafter, the spacecraft 1200 may go through certification and delivery (block 1110) to be placed in service (block 1112). Implementation of the disclosed method 1000 and/or use of the disclosed satellite dispenser 100 may form a portion of component and subassembly manufacturing (block 1106) and/or system integration (block 1108). Routine maintenance and service (block 1114) may include modification, reconfiguration, refurbishment, etc. of one or more systems of the spacecraft 1200.

Each of the processes of the method 1100 illustrated in FIG. 24 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the satellite dispenser 100 and the method 1000 shown or described herein may be employed during any one or more of the stages of the manufacturing and service method 1100 shown in the flow diagram illustrated by FIG. 24. For example, assembly of the satellite dispenser 100 may correspond to component and subassembly manufacturing (block 1106) and may be prepared in a manner similar to components or subassemblies prepared while the spacecraft 1200 is in service (block 1112). Also, one or more examples of the satellite dispenser 100 and the method 1000 described herein may be utilized during system integration (block 1108) and certification and delivery (block 1110). Similarly, one or more examples of the satellite dispenser 100 and the method 1000 described herein may be utilized, for example and without limitation, while the spacecraft 1200 is in service (block 1112) and during maintenance and service (block 1114).

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the terms "about" and "approximately" refer to or represent a condition that is close to, but not exactly, the stated condition that still performs the desired function or achieves the desired result. As an example, the terms "about" and "approximately" refer to a condition that is within an acceptable predetermined tolerance or accuracy. For example, the terms "about" and "approximately" refer to a condition that is within 10% of the stated condition. However, the terms "about" and "approximately" do not exclude a condition that is exactly the stated condition.

In FIG. 25, referred to above, the blocks may represent functional elements, features, or components thereof and lines connecting the various blocks do not necessarily imply any particular structure. Accordingly, modifications, additions and/or omissions may be made to the illustrated structure. Additionally, those skilled in the art will appreciate that not all elements described and illustrated in FIGS. 1-22 and 25, referred to above, need be included in every example and not all elements described herein are necessarily depicted in each illustrative example. Unless otherwise explicitly stated, the schematic illustrations of examples depicted in FIGS. 1-22 and 25, referred to above, are not meant to imply structural limitations with respect to the illustrative example. Rather, although one illustrative structure is indicated, it is to be understood that the structure may be modified when appropriate.

In FIGS. 23 and 24, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 23 and 24 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the satellite dispenser 100 and the method 1000 have been shown and described, modifications may occur to those skilled in the art upon reading the specification. The present application includes such modifications and is limited only by the scope of the claims.

What is claimed is:

1. A satellite dispenser, comprising:
a central tubular structure;
a plurality of satellites arranged around the central tubular structure; and
a plurality of shear connectors coupling the central tubular structure and the plurality of satellites together in shear continuity, each one of the plurality of shear connectors comprising:
a connector first portion coupled to the central tubular structure;
a connector second portion coupled to one of the plurality of satellites;
a shear pin that couples the connector first portion and the connector second portion together in shear; and
a releasable fastener that couples the connector first portion and the connector second portion together and that is configured to selectively separate the connector second portion from the connector first portion in response to a command signal,
wherein:
the connector first portion comprises a first aperture;
the connector second portion comprises a second aperture;
the shear pin comprises a pin first portion having a cylindrical surface and a pin second portion having a frustoconical surface;
a largest diameter of the frustoconical surface is greater than a diameter of the cylindrical surface;
the pin first portion is received by one of the first aperture or the second aperture; and
the pin second portion is received by another one of the first aperture or the second aperture.

2. The satellite dispenser of claim 1, wherein the connector first portion and the connector second portion each one of the plurality of shear connectors is separable to selectively release the plurality of satellites from the central tubular structure.

3. The satellite dispenser of claim 1, wherein:
the central tubular structure comprises a plurality of frame members and a skin, coupled to the plurality of frame members; and
each one of the plurality of shear connectors couples one of the plurality of satellites to one of the plurality of frame members.

4. The satellite dispenser of claim 3, wherein:
each one of the plurality of satellites comprises a plurality of bulkheads; and
each one of the plurality of shear connectors couples one of the plurality of bulkheads to one of the plurality of frame members.

5. The satellite dispenser of claim 4, wherein:
the connector first portion is coupled to one of the plurality of frame members;
the connector second portion is coupled to one of the plurality of bulkheads; and
the connector second portion is selectively separable from the connector first portion along a plane of separation.

6. The satellite dispenser of claim 1, wherein:
the connector first portion comprises a plurality of first apertures;
the connector second portion comprises a plurality of second apertures; and
each one of the plurality of shear connectors comprises a plurality of shear pins;
the pin first portion of each one of the plurality of shear pins is received by one of the plurality of first apertures; and
the pin second portion of each one of the plurality of shear pins is received by one of the plurality of second apertures.

7. The satellite dispenser of claim 1, wherein:
the pin first portion of the shear pin is received by the one of the first aperture or the second aperture via a transition fit or an interference fit; and
the pin second portion of the shear pin is received by the another one of the first aperture or the second aperture via a transition fit or an interference fit.

8. The satellite dispenser of claim 4, wherein sets of the plurality of shear connectors couple each one of the plurality of bulkheads to a corresponding one of the plurality of frame members.

9. The satellite dispenser of claim 8, wherein:
the plurality of bulkheads of each one of the plurality of satellites comprises:
a first closeout bulkhead;
a second closeout bulkhead, opposite to the first closeout bulkhead; and
an interior bulkhead located between the first closeout bulkhead and the second closeout bulkhead; and
a first one of the sets of the plurality of shear connectors couples the first closeout bulkhead to a first one of the plurality of frame members;
a second one of the sets of the plurality of shear connectors couples the second closeout bulkhead to a second one of the plurality of frame members; and
a third one of the sets of the plurality of shear connectors couples the interior bulkhead to a third one of the plurality of frame members.

10. The satellite dispenser of claim 3, wherein the plurality of frame members is located on an interior of the central tubular structure.

11. The satellite dispenser of claim 1, further comprising a fitting coupled to the central tubular structure, wherein the fitting is configured to interface with a launch vehicle.

12. A spacecraft, comprising:
a launch vehicle; and
a satellite dispenser coupled to the launch vehicle, wherein the satellite dispenser comprises:
a central tubular structure;
a plurality of satellites arranged around the central tubular structure; and
a plurality of shear connectors coupling the central tubular structure and the plurality of satellites together in shear continuity, each one of the plurality of shear connectors comprising:
a connector first portion coupled to the central tubular structure;
a connector second portion coupled to one of the plurality of satellites;
a shear pin that couples the connector first portion and the connector second portion together in shear; and
a releasable fastener that couples the connector first portion and the connector second portion together and that is configured to selectively separate the connector second portion from the connector first portion in response to a command,
wherein:
the connector first portion comprises a first aperture;
the connector second portion comprises a second aperture;
the shear pin comprises a pin first portion having a cylindrical surface and a pin second portion having a frustoconical surface;
a largest diameter of the frustoconical surface is greater than a diameter of the cylindrical surface;
the pin first portion is received by one of the first aperture or the second aperture;
the pin second portion is received by another one of the first aperture or the second aperture
the connector first portion and the connector second portion of each one of the plurality of shear connectors is separable to selectively release the plurality of satellites from the central tubular structure.

13. The spacecraft of claim 12, wherein:
the central tubular structure has a longitudinal axis and comprises:
a plurality of frame members extending along the longitudinal axis; and
a skin coupled to the plurality of frame members;
each one of the plurality of satellites comprises:
a plurality of bulkheads; and
an external shell, coupled to the plurality of bulkheads; and
each one of the plurality of shear connectors couples one of the plurality of bulkheads to one of the plurality of frame members.

14. The spacecraft of claim 13, wherein a set of the plurality of shear connectors couples each one of the plurality of bulkheads to a corresponding one of the plurality of frame members.

15. The spacecraft of claim 13, wherein:
the connector first portion is coupled to one of the plurality of frame members; and
the connector second portion is coupled to one of the plurality of bulkheads; and
the connector second portion is selectively separable from the connector first portion along a plane of separation.

16. A method of supporting a plurality of satellites, the method comprising steps of:
arranging the plurality of satellites around a central tubular structure; and
releasably coupling each one of the plurality of satellites and the central tubular structure together in shear continuity using a plurality of shear connectors,
wherein:
each one of the plurality of shear connectors comprises:
a connector first portion coupled to the central tubular structure;
a connector second portion coupled to one of the plurality of satellites;
a shear pin that couples the connector first portion and the connector second portion together in shear; and
a releasable fastener that couples the connector first portion and the connector second portion together and that is configured to selectively separate the connector second portion from the connector first portion in response to a command signal;
the connector first portion comprises a first aperture;
the connector second portion comprises a second aperture;
the shear pin comprises a pin first portion having a cylindrical surface and a pin second portion having a frustoconical surface;
a largest diameter of the frustoconical surface is greater than a diameter of the cylindrical surface;
the pin first portion is received by one of the first aperture or the second aperture;
the pin second portion is received by another one of the first aperture or the second aperture; and
the connector first portion and the connector second portion of each one of the plurality of shear connectors is separable to selectively release the plurality of satellites from the central tubular structure.

17. The method of claim 16, wherein the step of releasably coupling each one of the plurality of satellites and the central tubular structure together in shear continuity using the plurality of shear connectors comprises:

- coupling the connector second portion to at least one of a plurality of bulkheads of each one of the plurality of satellites;
- coupling the connector first portion to at least one of a plurality of frame members of the central tubular structure; and
- coupling the connector second portion to the connector first portion using a plurality of shear pins.

18. The method of claim 16, further comprising selectively separating the connector second portion from the connector first portion of each one of the plurality of shear connectors along a center axis of the shear pin to release each one of the plurality of satellites from the central tubular structure.

19. The satellite dispenser of claim 1, wherein the releasable fastener is configured to react to at least one of an axial load, a bending load, and a torsion load acting along a center axis of at least one of the plurality of shear connectors.

20. The spacecraft of claim 12, wherein the releasable fastener is configured to react to at least one of an axial load, a bending load, and a torsion load acting along a center axis of at least one of the plurality of shear connectors.

\* \* \* \* \*